US009177013B2

(12) United States Patent
Rollins et al.

(10) Patent No.: US 9,177,013 B2
(45) Date of Patent: Nov. 3, 2015

(54) SYSTEM AND METHOD FOR CITATION PROCESSING, PRESENTATION AND TRANSPORT AND FOR VALIDATING REFERENCES

(71) Applicant: Thomson Reuters Global Resources, Baar (CH)

(72) Inventors: Jason Rollins, Philadelphia, PA (US); Noah Merritt, Charlottesville, VA (US); Paul Patanella, Bryn Mawr, PA (US); Eftim Pop-Lazarov, Wilmington, DE (US); Stephen J. Rieger, Carlsbad, CA (US); David M. Pedrick, Maple Shade, NJ (US); Sandro Cifelli, Blackwood, NJ (US)

(73) Assignee: Thomson Reuters Global Resources (CH)

( * ) Notice: Subject to any disclaimer, the term of this patent is extended or adjusted under 35 U.S.C. 154(b) by 0 days.

(21) Appl. No.: 14/218,951

(22) Filed: Mar. 18, 2014

(65) Prior Publication Data

US 2015/0039639 A1 Feb. 5, 2015

Related U.S. Application Data

(63) Continuation of application No. 13/161,438, filed on Jun. 15, 2011, now Pat. No. 8,676,780.

(51) Int. Cl.
*G06F 7/00* (2006.01)
*G06F 17/30* (2006.01)
*G06F 17/27* (2006.01)

(52) U.S. Cl.
CPC ...... *G06F 17/30386* (2013.01); *G06F 17/2705* (2013.01); *G06F 17/2745* (2013.01); *G06F 17/30728* (2013.01)

(58) Field of Classification Search
CPC ................................................ G06F 17/30728
USPC ....................................................... 707/758
See application file for complete search history.

(56) References Cited

U.S. PATENT DOCUMENTS

| | | | | |
|---|---|---|---|---|
| 5,097,418 A | * | 3/1992 | Nurse et al. | 715/207 |
| 5,794,236 A | * | 8/1998 | Mehrle | 1/1 |
| 5,832,476 A | * | 11/1998 | Tada et al. | 707/723 |
| 6,289,342 B1 | * | 9/2001 | Lawrence et al. | 1/1 |
| 6,728,725 B2 | * | 4/2004 | Garfield et al. | 1/1 |
| 7,028,259 B1 | * | 4/2006 | Jacobson | 715/236 |
| 7,529,756 B1 | * | 5/2009 | Haschart et al. | 1/1 |
| 2002/0156760 A1 | * | 10/2002 | Lawrence et al. | 707/1 |
| 2010/0005388 A1 | * | 1/2010 | Haschart et al. | 715/256 |

* cited by examiner

*Primary Examiner* — Binh V Ho
(74) *Attorney, Agent, or Firm* — Valenti, Hanley and Robinson, PLLC; Kevin T. Duncan

(57) ABSTRACT

The present invention comprises a system and method for automatically processing one or more citations contained within a document while the document is presented by a document rendering application. The method of the present invention comprises scanning the document to identify an unformatted citation and parsing the unformatted citation to determine one or more citation terms. One or more citation libraries are queried to find citations comprising the one or more citation terms. A citation falling within the scope of the query is selected and inserted into the document. The present invention may further provide enhanced workflow solutions for authors and publishers in preparing documents in structured format for facilitating efficient and accurate validation of references cited or included in papers and other submissions for publication or for review. An author prepares a document containing a set of cited references using a formatting structure. A system includes a processor to process the document to extract embedded metadata associated with the set of cited references. The processor executes code associated with a reference validation software module and automatically recognizes the formatting structure and the embedded metadata. The processor automatically extracts the embedded metadata and compares the extracted metadata against an authority database to determine the validity of the set of cited references.

20 Claims, 21 Drawing Sheets

| Reference | Count | Library |
|---|---|---|
| Abbott, 2002 #33 | 2 | Sample.enl |
| Argus, 1991 #14 | 1 | Sample.enl |
| Biloski, 1987 #16 | 4 | Sample.enl |
| Schwartz, 1976 #24 | 1 | Traveling Library |
| Turnhouse, 1987 #26 | 1 | Traveling Library |
| Whiting, 1987 #27 | 1 | Sample.enl |
| Zeta, 2009 #45 | 2 | Sample.enl |
| Total: | 12 | |

[Import Traveling Library...] [Open Record...] [View in Word...] [Close]

Figure 16

SYSTEM AND METHOD FOR CITATION PROCESSING, PRESENTATION AND TRANSPORT AND FOR VALIDATING REFERENCES

RELATED APPLICATIONS

The present application claims benefit of priority as a continuation of U.S. application Ser. No. 13/161,438, filed Jun. 6, 2011, entitled "SYSTEM AND METHOD FOR CITATION PROCESSING, PRESENTATION AND TRANSPORT AND FOR VALIDATING REFERENCES," all of which is incorporated herein by reference in its entirety.

FIELD OF THE INVENTION

The field of the invention relates generally to document processing and more particularly to systems and methods for dynamically processing citation data, particularly literary citations, for presentation within a document rendering application, such as a word processor. The invention further relates generally to information science and infometrics (or informetrics) and more particularly to the fields of bibliometrics and scientometrics and validating reference information included in works of authorship.

BACKGROUND OF THE INVENTION

With the advents of the printing press, typeset, typewriting machines, and computer-implemented word processing and storage, the amount of information generated by mankind has risen dramatically and with an ever quickening pace. As a result there is a continuing and growing need to accurately collect and store, identify, track, classify and catalogue for retrieval and distribution this growing sea of information.

In the area of scholarly and scientific research and writing a sophisticated process and convention for documenting research, supporting materials and organizing fields of study has emerged called "bibliographic citation." Such scientific writings include, among other things, books, articles published in journals, magazines or other periodicals, manuscripts, and papers presented, submitted and published by society, industry and professional organizations such as in proceedings and transactions publications. To facilitate the widespread distribution of information published in scholarly writings to more efficiently and effectively move bodies of study forward, scholars and scientists use bibliographic citation to recognize the prior work of others, or even themselves, on which advancements set forth in their writings are based. "Citations" or "cited references," as included in any particular work or body of work, is used herein to refer broadly to cited references, bibliographic or other reference data, that collectively form in-text citations, footnotes, endnotes, and bibliographies and are used to identify sources of information relied on or considered by the author and to give the reader a way to confirm accuracy of the content and direction for further study. A "bibliography" may refer to either of a complete or selective list or compilation of writings specific to an author, publisher or given subject, or it may refer to a list or compilation of writings relied on or considered by an author in preparing a particular work, such as a paper, article, book or other informational object.

Citations briefly describe and identify each cited writing as a source of information or reference to an authority. Citations and bibliographies follow particular formatting conventions to enhance consistency in interpreting the information. Each citation typically includes the following information: full title, author name(s), publication data, including publisher identity, volume, edition and other data, and date and location of publication. Given the formatting requirements and numerous fields associated with each citation and given that there are tens and in some cases hundreds of citations in a given paper, the likelihood of misspellings and typographical errors presents a substantial problem in the publishing and research processes. Perhaps other than the title associated with a given paper, most of the fields are inherently ambiguous. For example, even the volume, page and date fields or data for a given reference is not particularly helpful in the event of an error. As opposed to the title information, where one letter missing or misspelled in one word from a string of words still leaves usable information, a missing or erroneous date or volume character makes the rest of the data largely useless or at least unreliable. Also, author names are most usually in an abbreviated form, such as an initial rather than full first or middle names (e.g., J. Smith), or suffer naturally from commonality with other authors, such as having either a common first or last name or both e.g., John Smith. This results in a latent ambiguity as to the actual identity of the author. There have been many attempts to disambiguate author and other citation information. A system and method for disambiguating information is disclosed in U.S. Ser. No. 11/799,786, filed May 2, 2007, entitled Method and System for Disambiguating Information Objects, which is owned by the assignee of the present application and is hereby incorporated herein by reference.

In support of the pursuits of science and research databases, database management tools, citation management and analysis tools, research authoring tools, and other powerful tools and resources have been used and developed for the beneficial use of scholars, researchers, and scientists. These tools and resources may be available to users in an online environment, over the Internet or some other computer network, and may be in the form of a client-server architecture, central and/or local database, application service provider (ASP), or other environment for effectively communicating and accessing electronic databases and software tools. Examples of such tools and resources are Thomson Scientific's Web of Science™ (WoS), Web of Knowledge™ (WoK), and ResearchSoft™ suite of publishing solutions including, EndNote™, EndNoteWeb™, ProCite™, Reference Manager™, and RefViz™, as well as solutions such as Scholar One's Manuscript Central™. A longstanding problem in the publication process has been accurately entering citation information in papers during creation and the time consuming and tedious process of manually verifying the accuracy of the citation prior to publication. Small but critical errors, such as incomplete information and incorrect information (e.g., misspellings and typographical errors) cause the author and publisher to lose credibility and cause the reader to waste effort searching for the referenced material incorrectly cited in the document.

Techniques used to help build out databases and confirm database information include extraction and sorting, such as parsing of data from sentence or word structures, performed on electronic documents to extract information from papers and citations for further processing.

"Writings," "manuscripts," and "papers," as used herein shall refer to both "hard" documents and "soft" electronic documents and shall be used interchangeably and given the broadest collective meaning. Such works of authorship are now widely created, edited, maintained, archived, catalogued and researched in whole or in part electronically. The Internet and other networks and intranets facilitate electronic distribution of and access to such information. The advent of databases, database management systems and search languages and in particular relational databases, e.g., DB2 and others developed by IBM, Oracle, Sybase, Microsoft and others, has provided powerful research and development tools and environments in which to further advance all areas of science and the study of science. There are companies and institutions that have created electronic databases and associated services, such as WoS and WoK, that are specifically designed to help organize and harness the vast array of knowledge.

Thousands of papers and manuscripts are submitted to reviewers and publishers daily by authors and many of the submissions include malformed references. To catch and correct these errors, the current path to publication usually includes a manual reference validation step consisting of checks for style and content accuracy. The validation task may be performed by a variety of roles, most commonly by a copy editor or a production editor, but also possibly by a typesetter. With papers and manuscripts commonly containing dozens (or hundreds) of cited references, the validation process is tedious and time-consuming, and adds significant costs to the publication process, having been estimated to account for up to 60% of a publisher's correction and formatting effort.

Recent developments have provided a significant opportunity to develop reference validation tools within the context of manuscript creation, submission, approval, proofing, and production processes. Many reference databases, which may be referred to herein as authority databases, have become available via web service connections. It is now possible to efficiently pull or extract reference lists from a manuscript or electronic document into XML. Also, processes used in the paper creation and submission process may be extended into the production stage of the publishing process to provide a complimentary, coordinated and efficient overall process.

Robust and accurate reference mark-up and validation tools are needed to effectively reduce the cost and burden associated with validating references prior to publication.

Existing effort and systems directed to "validation, XML, scholarly meta data, etc." include the following. XML validation, which presently applies to the validation of the XML tags and schema in a document and not to validating the associated data. Scholarly meta data and linking refers to for example the creation of a Digital Object Identifier (DOI) or unique digital identifier for a specific scholarly work, for example a URL. DOI may be used to identify content objects in a digital environment. Entities operating over digital networks are assigned DOI "names," and have associated with them "current" information, including address information. Name information does not change but other information, e.g., address, may change over time. A DOI system provides a framework for managing the following: identification, content; metadata, links, and media.

Improved methods and systems for automatically processing literary citations are needed to ensure or facilitate accuracy of processed citations, as well as select a citation from one or more acceptable citations based on a limited set of citation data, such as provided by an author within a document or a file associated with the document, such as a bibliography or other list of source materials or references.

SUMMARY OF THE INVENTION

The present invention is directed to systems and methods for automatically processing one or more citations contained within a document while the document is presented by a document rendering application. The method of the present invention comprises scanning the document to identify an unformatted citation and parsing the unformatted citation to determine one or more citation terms. One or more citation libraries are queried to find citations comprising the one or more citation terms. A citation falling within the scope of the query is selected, properly formatted and inserted into the document.

In order to automate the processing of citations contained within a document, scanning is executed periodically. According to one embodiment of the invention, scanning is executed when an idle state is identified. The method may comprise embedding into the document a traveling library comprising citation data that forms the citation inserted into the document. Also, links to citation data may be inserted that forms the citation falling within the scope of the query.

The present invention also contemplates a system for automatically processing one or more citations contained within a document while the document is presented by a document rendering application. The system of the present invention comprises citation editor software to identify an unformatted citation within the document. The citation editor software works in conjunction with a citation application to receive the unformatted citation, retrieve a citation that matches the unformatted citation from a citation library, and pass the citation back to the citation editor software for formatting and insertion into the document. The citation editor software may identify the unformatted citation on a periodic basis, such as when an idle state is identified.

The system may make use of a shared library to convert data from a first format to a second format. Accordingly, the first format may be a native format of the citation editor software and the second format a native format of the citation application. A traveling library may be employed that contains citation data that forms the citation, which is embedded into the document. According to embodiments of the invention, links are inserted into the document linking to citation data that forms the citation, which may comprise a drawing or chart.

The present invention provides enhanced workflow solutions for authors (e.g., researchers, scientists, and scholarly authors) and publishers (e.g., journals and professional and technical societies) in validating references cited or included in papers and other submissions for publication or for review. The invention accelerates the time to publish or market papers, journals, meeting abstracts, and conference proceedings and delivers significant productivity gains in the process. The invention enables users to access research and other productivity solutions remotely, such as via the Internet, across the world. The invention provides value-added information, with software tools and applications that help users become better informed and make better decisions and do both more efficiently. Although the invention may be described herein in the context of scientific research, the invention is also applicable in other applications and environments, including assisting users in the fields of law, tax, accounting, higher education, reference information, corporate e-learning and assessment, financial services, and healthcare.

In one embodiment, the present invention provides an integrated or integrate-able system of research and authoring productivity software for use in conjunction with databases of interest, e.g., WoS, WoK, CrossRef, and PubMed. By way of example, Thomson Scientific applications EndNote®, EndNote Web™, ProCite®, Reference Manager®, RefViz™, Abstract Central™, Proceedings Central™, and Manuscript Central™ are commercially available systems that may be used to provide a comprehensive solution to create, write, publish, submit, and manage bibliographies, papers, publications, and other scholarly pursuits. Many of the functions included in this system of solutions may be automated. The invention may be used with one or more or a combination of such solutions. Manuscript Central provides a web-based, database-driven peer review and online submission solution for scholarly publishers. Manuscript Central automates manuscript submission to journals and allows for easy administrative, editing and reviewing capabilities.

EndNote®, ProCite® and Reference Manager® are desktop applications, but may also be browser-based applications, used to publish and manage bibliographies. With these products users, e.g., students writing papers, professionals publishing research, can, for example, do the following: search Internet databases to build personal reference libraries; import references from online and CD-ROM databases and library catalogs; format bibliographies automatically for hundreds of scholarly publications; use Cite While You Write™ feature with Microsoft® Word® to create bibliographies instantly as references are cited. EndNote Web is a Web-based tool for managing and citing references in papers and creating bibliographies. Integrated seamlessly with EndNote desktop and the ISI Web of Knowledge$^{SM}$ research platform, EndNote Web provides an online collaborative environment for existing EndNote users, and an entree for undergraduate students requiring a basic bibliographic solution. RefViz™ provides a text analysis and visualization tool and works seamlessly with EndNote, ProCite and Reference Manager to provide a powerful way to explore reference libraries visually for major themes and topics. RefViz allows users to quickly evaluate vast amounts of references, accelerating the research process.

In one embodiment, the invention automatically validates references cited. As used to describe the invention, validating a reference does not merely mean to check citation format but rather means to validate that the cited reference actually exists and was published as cited. The difference is that a reference may be in appropriate format but yet may not relate to an existing publication. The goal of the invention is to confirm the accuracy of the submitted data. It is important to confirm that references identified in submitted papers exist so that readers can use the cited references to obtain copies of the referenced material to verify that the reference stands for the proposition as represented in the citing paper and to use the reference to facilitate further research. The validation process of the invention is to confirm that the cited reference actually exists. Validation means to confirm that the title, author, citation and other data appearing in the cited reference is accurate and not merely that it is in proper format. In this manner, simple errors, wholly incorrect cites, and fraudulent representations may be discovered and acted upon.

After running the validation process on a submitted paper or extracted reference list, the system can respond to the user or other concern involved in the process (e.g., peer review board) in any of a number of ways. For example, the system can give an indication of verification, identify which references have or have not been validated, delineate the data or fields in the cited reference or document that appear to be incorrect, and suggest closely matching reference data as a substitute for the erroneous data. The system can also include hyperlinks, for example, associated with the cited references to directly link the results page with the actual, confirmed reference or a suggested reference. The invention is not limited to validating authors, citations, dates, etc. and can be used to validate any feature appearing in a cited reference or even a paper for which there is a corresponding authority database against which the data may be compared. For example, if an author claims to be a "Fellow" or "Member" of a society, e.g., IEEE, or a member of the faculty of a school or in a chaired position, for example, then as long as the system has access to an authority database of membership data for that society or faculty, the information from the paper or other document may be extracted, marked-up or otherwise, and may be compared against the database and the data validated. In addition, these processes may be used to validate that the paper has not previously been published. As part of the process, a user can select from a list of databases against which the validation process is to be performed or the system may default to a predefined set of one or more databases. Exemplary databases for use with the present invention include public reference databases; e.g., CrossRef, and PubMed; commercial databases; e.g., Web of Science (WoS), Web of Knowledge (WoK), and BIOSYS; and privately held specialized databases.

In one embodiment the invention provides a computer-based method for processing one or more citations within a document. The method includes identifying in an electronic document an unformatted citation; parsing the identified unformatted citation and determining one or more citation terms; querying one or more citation libraries to find possible matching citations, each possible matching citation comprising at least a portion of the one or more citation terms; presenting for selecting a set of possible matching citations; and inserting a formatted citation based on a selected one of the set of possible matching citations into the document. In addition, the method may provide a hyperlink between an in-text citation within the document and a corresponding citation in a bibliography of citations. The document may have multiple sections, each section having a separate bibliography of citations, and the in-text citation may be linked based on the section of text in which it appears and the bibliography associated with that section. The method may include embedding into the document a traveling library comprising citation data that forms the formatted citation inserted into the document. The method may include switching between in-text citation formats while preparing the document; automatically grouping a set of citations into an organizational group; automatically updating the organizational group to include additional citations as citations are inserted in or deleted from the document; providing a list of citation references included in the document, the list including at least one hyperlink to a source citation reference; enabling a user to set format preferences; and using the format preferences to generate the formatted citation from the selected possible citation.

In another embodiment the invention provides a computer-based system for processing one or more citations within a document. The system includes: citation identifying code set adapted to identify an unformatted citation within a document; a matching citation code set adapted to access a citation library having stored therein a set of citations and to compare the identified unformatted citation against the citation library to identify a set of citations that potentially match the unformatted citation; and an insertion code set adapted to insert a formatted citation into the document based on receiving a selection of one of the set of potentially matching citations.

The present invention provides the following functional features: Source application switching; Microsoft Word citation import; Section bibliographies; Composite citations; Link from citations to bibliography; Generate an organizational group in source reference management application; and Manage references from multiple libraries.

More particularly, Source application switching provides a method to store an identical reference library in a desktop database and on the Web, insert references into a document from either location, and seamlessly format and update citations from either source application.

Microsoft Word citation import provides a mechanism to harvest XML citation data inserted into a document by Microsoft Word 2007 or later, and to convert this into a preferred, predefined or proprietary in-document data format.

Section bibliographies provides a mechanism to identify section markers within a document and to create separate bibliographies at the end of each section, with or without a complete bibliography at the end of the document.

Composite citations provides a mechanism for treating a group of references as one composite citation, grouped together as one entry in a bibliography and distinguished individually by specific alphanumeric labels as specified by a given set of bibliographic formatting rules.

Link from citations to bibliography provides a mechanism for navigating to an entry in a bibliography by clicking on an in-text citation, which is treated as a hyperlink for this purpose.

Generate an organizational group in source reference management application provides a mechanism to automatically create, within the source reference management application, an organizational grouping of the references being used in a document, which grouping is then updated automatically as references are inserted into the document or deleted from the document.

Manage references from multiple libraries provides support for inserting references into a document from multiple reference libraries, and provides a user interface which indicates the source library for each reference and allows the user to update individual references from their source library or to replace a reference with a version from another library.

BRIEF DESCRIPTION OF THE DRAWING

In order to facilitate a full understanding of the present invention, reference is now made to the accompanying drawings, in which like elements are referenced with like numerals. These drawings should not be construed as limiting the present invention, but are intended to be exemplary and for reference.

FIG. 16 is a screenshot of a dialog screen for numbered citations.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

As described herein, the term "item" and the terms "writing", "manuscript", "paper", and "article" shall be understood to refer to hard and soft documents, papers, writings, and other publications and are all meant to each inherently refer to the other terms as the invention is intended to cover all sorts of publications, papers, writings, articles, letters, editorials, books, chapters, or other kinds of published papers or documents. Part of the information captured, for instance in extracting information from an item, is the item's bibliography of cited references. Items in such bibliographies may be referred to as "reference items". Some reference items may be items captured as a source item but not necessarily.

Figure 1:
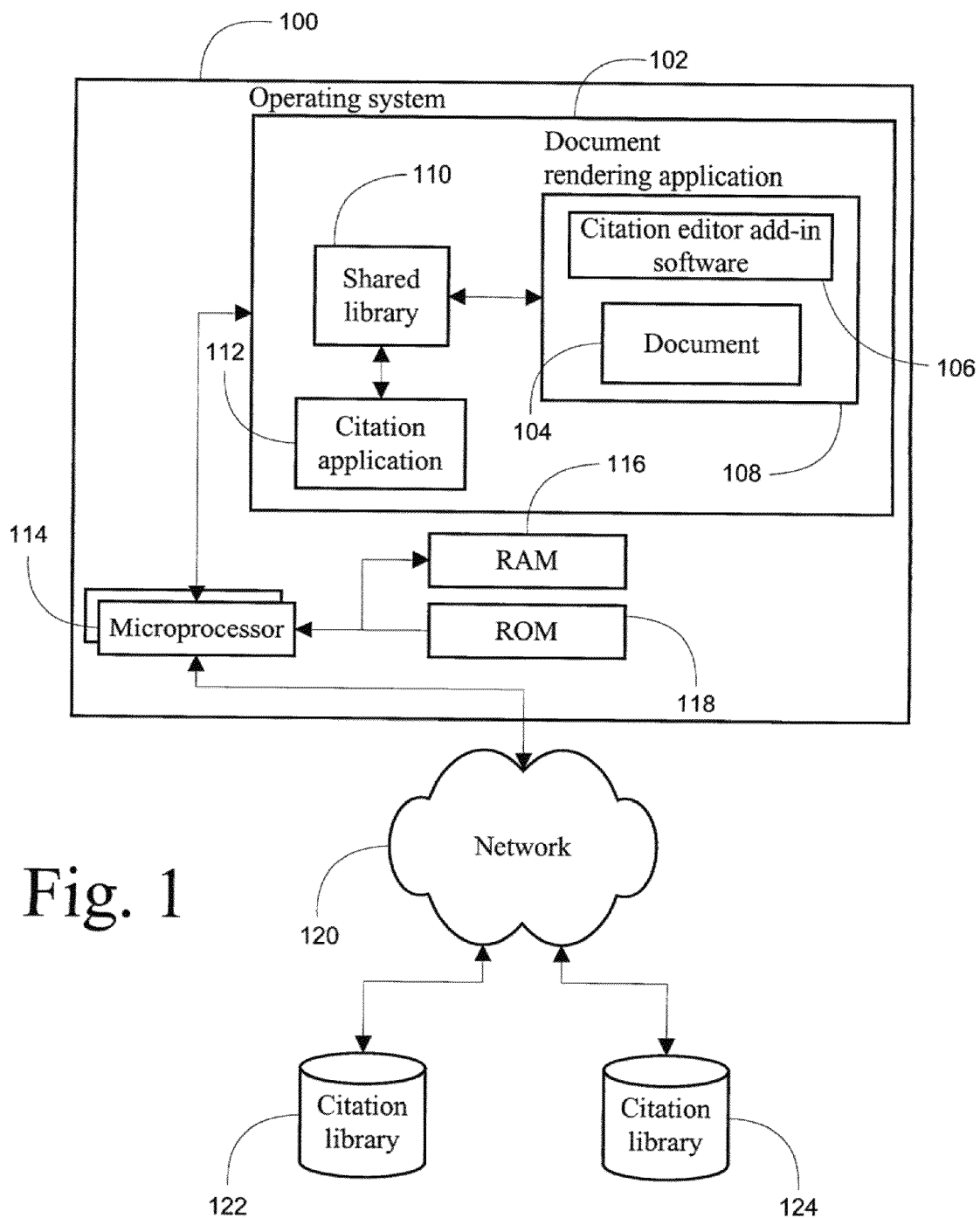
FIG. 1 is a block diagram presenting a configuration of hardware and software components according to one embodiment of the present invention.

With reference to FIGS. 1 through 8, various embodiments of the invention are presented. FIG. 1 is a block diagram presenting one embodiment of a configuration of the hardware and software components comprising the present invention. A general purpose operating system 102 is provided as a framework for storing data and executing applications, as well as policing the flow of input and output. Exemplary general purpose operating systems are Mac OS from Apple Computer, Inc., Windows from Microsoft Corp., and various distributions of the Linux and UNIX operating systems.

A computer 100 that comprises one or more microprocessors 114 executes the operating system 102. When the computer initially boots up, instructions are provided from Read-Only Memory (ROM) 118 in order to provide a basic set of input/output functionality to the microprocessor 114. The set of instructions contained in ROM 118 is used by the microprocessor 114 to load the operating system 102, which is typically maintained on a persistent storage device such as a hard drive (not pictured). The microprocessor 114 uses Random Access Memory 116 in order to maintain transient storage space that is used by the operating system 102 in addition to other executing application programs, e.g., a document rendering application 108.

An author using the computer 100 executes a document rendering application 108. According to one embodiment of the invention, the document rendering application 108 is a word processor used to draft text and similar mixed media documents, such as MICROSOFT WORD™. Alternatively, the document rendering application may comprise a HTML text editor, such as MICROSOFT FRONTPAGE™ or BBEDIT™ by Bare Bones Software, Inc. Indeed, all software systems designed to manipulate and render text data files fall within the scope of the present invention.

Many document rendering applications 108 comprise the capability to expand the functionality of the application through the use of a plug-in or similar architecture. The system of present invention comprises a citation editor add-in 106 that provides citation processing within the context of the document rendering application 108. In Microsoft Word, a programmer may develop an add-in, also referred to as a global template, to provide generic functionality in the Word environment. For example, an add-in may contain common tools for working with documents 104. The author is provided access to functionality of the citation editor add-in 106 by clicking graphical toolbar elements and menu commands that the citation editor add-in offers. Alternatively, the citation editor add-in may be a supplemental program that adds custom commands or custom features to an application. It should be noted that the citation editor add-in, as well as the other components of the present invention, may be embodied as software stored on computer readable media that, when loaded by a computer, instructs the computer to execute the processes described in greater detail herein.

According to one embodiment of the invention, the citation editor add-in 106 is a COM (Component Object Model) object designed to be loaded and run in one or more Microsoft Office applications. COM add-ins are designed to connect to and disconnect from one or more Office applications using an architecture that is shared between the applications. The citation editor add-in 106 may be implemented with any number of programming tools capable of creating DLLs (Dynamic Link Libraries).

The citation editor add-in 106 provides access to multiple functions related to the creation of citations, as well as bibliographies. Exemplary functionality includes the capability to find, edit and insert citations, access to an external citation application, format a bibliography, remove specialized field codes from a document, and prepare a traveling library for export with the document wherein other authors may have access to the citation reference used to build a citation contained within a document 104. The citation editor add-in 106 also provides instant formatting of citations while an author is drafting a document. According to embodiments of the invention the citation may comprise a graphic, such as a drawing or chart that is being cited.

When the document rendering application 108 is executed, the citation editor add-in 106 is loaded. The citation editor add-in 106 implements the menu and toolbar elements, which provide communication to the citation application 112 and the document rendering application 108 as required to implement or execute the command selected by the document author. According to one embodiment, this communication in implemented by way of COM interfaces exposed by the document rendering application 106 and the citation application 112 by way of a shared library 110. Furthermore, the citation editor add-in 106 monitors the document 104 for conditions that require citation processing, e.g., the presence of temporary citations.

The shared library 110 may be loaded by the citation application 112 or by the citation editor add-in 106 when the document rendering application 108 is initially instantiated. The shared library 110 serves as an intermediary between the citation editor add-in 106 and the citation application 112. Essentially, the shared library 110 converts data from an initial format to a format that is native to the citation application 112. For example, where the citation editor add-in 106 is implemented as a COM object, the shared library 110 translates COM data elements into data elements that adhere to the communication protocol or format that is native to the citation application 112, e.g., provides the COM interface.

The shared library 110 offers an interface to the functionality provided by the citation application 112, which is where application logic executed by the citation editor add-in 106 resides. One major function of the citation application 112 is to provide underlying citation data that is used by the citation editor add-in 106 to present properly formatted citations within a document 104. The citation editor add-in 106 periodically scans the document 104, e.g., when an idle state is detected due to the fact the author has stopped entering text or commands. According to one embodiment of the invention, temporary citations are identified and the citation terms contained within the temporary citation are passed to the citation application 112 via the shared library 110. Alternatively, the author may manually indicate temporary citations for processing on a case-by-case basis.

Advantageously, an author may supply pieces of a citation within a document 104 in an unformatted fashion whereby the citation editor add-in 106, in conjunction with the citation application 112, modifies the data to provide a complete formatted citation. The citation editor add-in 106 periodically scans the document 104 to identify temporary citations. According to one embodiment, the citation editor add-in 106 scans the document 104 when an idle period is identified, e.g., when the author pauses in the process of editing or entering commands. The citation editor add-in 106, in conjunction with the citation application 112, replaces the temporary citation with a properly formatted citation. Furthermore, it should be noted that the citation may be used to reference a chart or drawing cited through the use of a temporary citation, which may be scanned and formatted by the present invention.

The process of automatically formatting of citations is also referred to as background or instant formatting. It allows an author to always be working with current formatted citations within a document 104. When an author adds a citation to a document 104, the system and method of the present invention formats the citation in the body of the document 104 and may also append the citation to a bibliography at the end of the document 104. The process may also be triggered when a new citation is entered, or when an existing citation is modified to ensure the citation is correct. According to one embodiment, an instant formatting flag is set within the document metadata to instruct the citation editor add-in 106 whether instant formatting should be executed. When instant formatting is disabled, the author may manually access the citation functionality of the citation application 112 through graphical controls presented by the content editor add-in 106, albeit manually.

When scanning, the citation editor add-in 106 identifies citation delimiters, which as a default are represented by curly braces ("{ }"), although the author may define a custom set of citation delimiters. Within the citation delimiters are a number of citation terms separated by a term delimiter, such as a comma. Accordingly a temporary citation may contain no commas, one comma, two commas, or three or more commas. Semicolons or another suitable delimiter may be used within a set of citation terms to serve as a citation separator so that the search for each citation is executed separately, e.g., {Smith, 1991, Dinosaur; Dolphin}. The citation editor add-in 106 scans the document and identifies citations entered into the document 104 by the author. The terms within the term delimiters are parsed into one or more citation terms and passed to the citation application 112 by way of the shared library 110, which converts data into the native format of the citation application 112. The citation application 112 analyzes the received terms to identify the presence of term delimiters (commas) and citation delimiters (semicolons). Where commas are utilized to delimit terms, strict resolution is utilized. For example, the citation {Smith Jones, 1998 March, Dinosaur extinction} is resolved as if each of the terms is enclosed by quotation marks, as is well 5 known to those of skill in the art. Alternatively, where one or more terms are supplied, e.g., {Smith Jones 1998 March Dinosaur extinction}, the citation is resolved by supplying a Boolean "AND" between each of the terms and identifying citations comprising all of the terms. The citation application's analysis results in the formulation of a citation query.

The citation application 112 uses the citation query to query one or more citation libraries 122 and 124. The citation libraries 122 and 124 may be accessed over a network 120, which may be a local or wide area network, such as an intranet or the Internet. As is explained in greater detail herein, a local database (not pictured) may be maintained comprising selected citations chosen by the author, obviating the need to access the remote sources 122 and 124. Each citation library 122 and 124 comprises one or more citations for references appearing in one or more journals.

Host data files may be provided indicating the address of remote citation libraries such as university card catalogs, the Library of Congress, specialized databases such as PubMed, PsycINFO, and ERIC from popular providers such as Ovid Technologies, SilverPlatter, and OCLC. Typically the citation library comprises a database manager that accepts the citation query, searches the citations contained within the library 122 and 124, and returns a result set comprising citations falling within the scope of the citation query. The citation query may preferably be submitted simultaneously to a plurality of citation libraries 122 and 124.

The result set is returned to the citation application 112. Where the result set comprises only one citation, e.g., a definitive match was found to the query, the citation that the author wishes to insert into the document 104 is identified. The citation data is passed to the citation editor add-in 106 via the shared library 110 for insertion into the document 104. "Field codes" that references citation data are inserted into the document, which may be stored in local or remote citation libraries maintained by the user or a third party data provider. The field codes are links to underlying citation data that is used as a source for the formatted citation displayed in the document.

In displaying the formatted citation, the format defined through the field codes may be set by author-defined parameters. Various scholarly journals have different constraints regarding the formatting requirement for citations. For example, the Journal of the American Medical Association may require that citations adhere to a first format, while the journal Science may require a wholly different citation format. The system of the present invention may advantageously be supplied with citation format parameters for well known journals and publications. In this manner, an author may ensure that citations within a document adhere to a target publication's citation specifications simply by selecting the publication through an interface whereby the parameters are automatically set. Alternatively, or in combination, the author may override anyone or more citation format parameters to set a desired value. Furthermore, functionality is provided whereby an author may change the target publication for a document, causing the software to traverse the document and modify the format of the citations contained therein to adhere to the new target publication's citation specifications.

Another feature offered by the system and method of the present invention is a "traveling library". The author may export a traveling library whereby the field codes are used to embed data regarding the reference into the document. When the document is accessed by a collaborator that does not have access to the same citation libraries 122 and 124, the reference data can be found and the full citation and reference are provided when the file is loaded into a document rendering program, thereby obviating the need to manually locate the citations again using the citation application 112 to recreate the libraries used by their collaborators. Furthermore, where a collaborator uses additional libraries to insert citations within the document, these may be exported and passed back to the original author, who has access to the full set of citation data.

Figure 2:
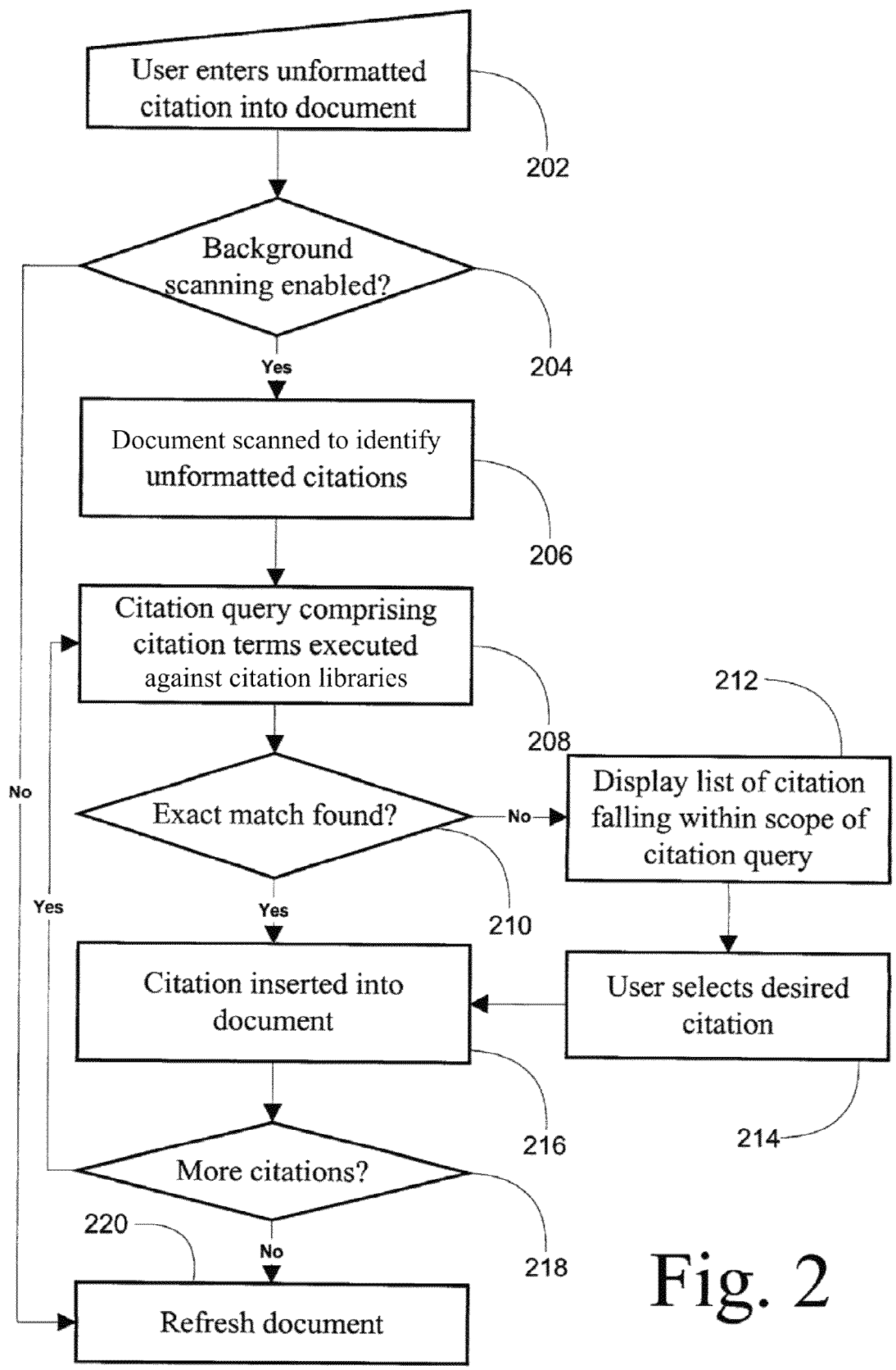
FIG. 2 is a flow diagram presenting a process for automatically formatting citations within a document according to one embodiment of the present invention.

FIG. 2 presents a flow diagram illustrating a method of operating the hardware and software components of FIG. 1 to automatically format citations contained within a document. Using a document rendering application such as a word processor, an author enters an unformatted citation, which is enclosed or encapsulated by a set of citation delimiters, for example, curly braces, step 202. Alternatively, the author may perform edits to a formatted citation requiring the citation to be revalidated or reformatted. A check is performed to determine if background citation scanning is enabled, step 204. The check at step 204 is preferably performed when the document is loaded by the document rendering application. This data may be supplied through the use of a data flag that is set in the document's metadata. Where background scanning is not enabled, program flow is directed to step 220 where the document is refreshed without modifying the text inserted by the user.

Where background citation scanning is enabled, step 204, the document is scanned to identify unformatted citations or citations that have been formatted but subsequently modified, step 206. Identifying citations that have been modified after being formatted may be accomplished in a number of ways. For example, a data file may be maintained where the citation editor add-in compiles a listing of all formatted citations in a given document. Each time the document is scanned, the citation editor add-in compares the formatted citations in the document with the previously formatted citations contained in the data file to determine if any formatted citations have been subsequently modified. Alternatively, the citation editor add-in may set a flag each time a citation is formatted, which is removed if a formatted citation is subsequently modified. When scanning, the citation editor add-in checks the formatting of all previously formatted citations where the flag has been removed.

According to embodiments of the invention, the step of scanning the document is performed when an idle state is identified during the process of entering text or commands. The citation terms supplied by the author is parsed, determining the citation terms and any term delimiters that may be present in the citation, to prepare a citation query that is executed at one or more citation libraries, step 208. The result of the query are returned and analyzed to determine the number of records contained within the result set. A check is performed to determine if an exact match was identified as falling within the scope of the citation query, step 210.

Where an exact match has been found identifying a citation in one of the citation libraries, step 210, field codes identifying the citation are inserted into the document, providing a view to the citation data contained within the sole record in the result set, step 216. Where the result set comprises multiple records, however, a display is presented to the author presenting a listing of the citations that fall within the scope of the citation query, step 212. Using an input device, the author selects the citation that he or she wishes to appear in the document, step 214. Field codes identifying the citation are inserted into the document to provide a view to the citation data contained within the selected record from the result set, step 216.

A check is performed to determine if additional unformatted or modified citations are present in the document, step 218. Where additional citations that require formatting are present in the document, processing returns to step 208 where a citation query comprising citations terms from the outstanding citation is formulated and executed against one or more citation libraries as per steps 210, 212, 214 and 216. Where all the citations are processed, the document is refreshed whereby the field codes present formatted citation data to the author, step 220. According to embodiments of the invention, the process is repeated, step 206, 208, 210, 212, 214, 216 and 218, at regular intervals, e.g., when and idle period is encountered.

Figure 3:
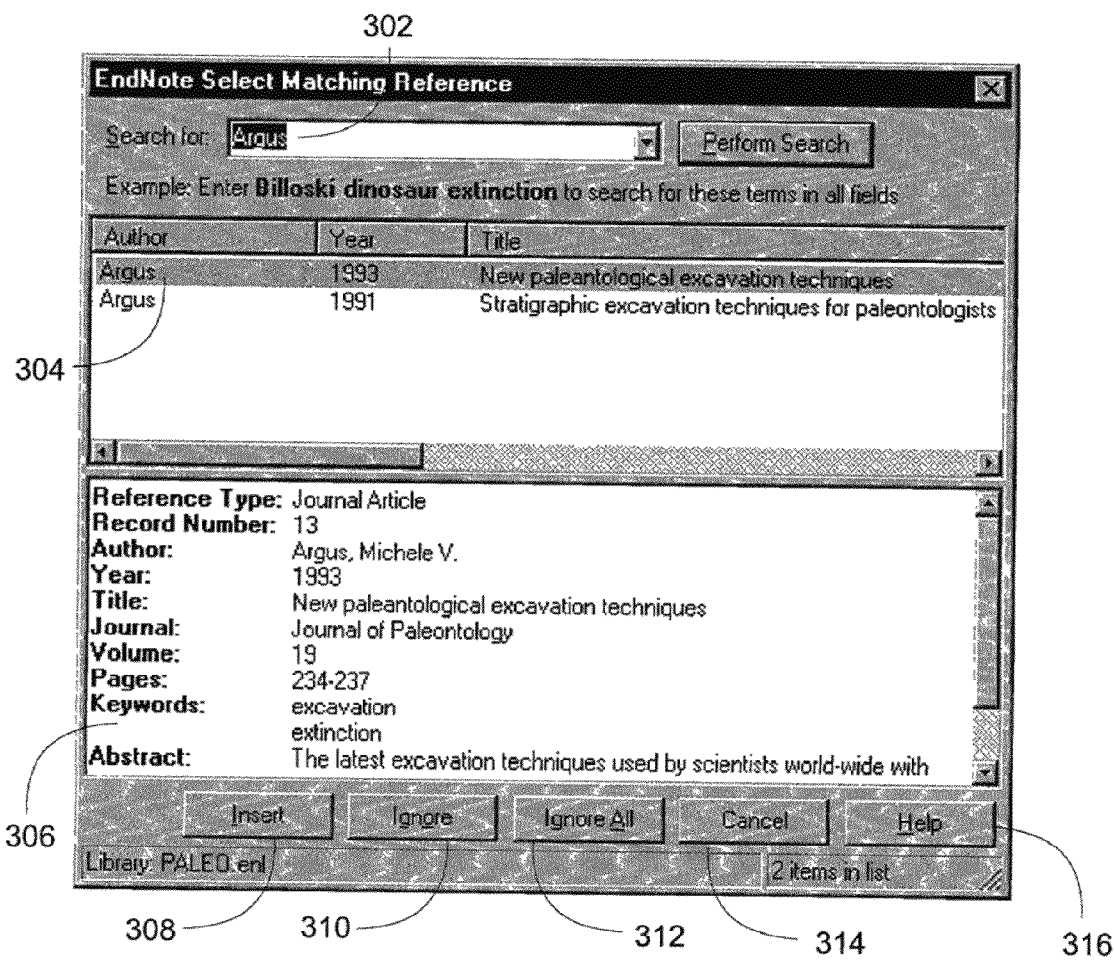
FIG. 3 is a screen diagram presenting an interface for resolving ambiguous citations according to one embodiment of the present invention.
Figure 4:
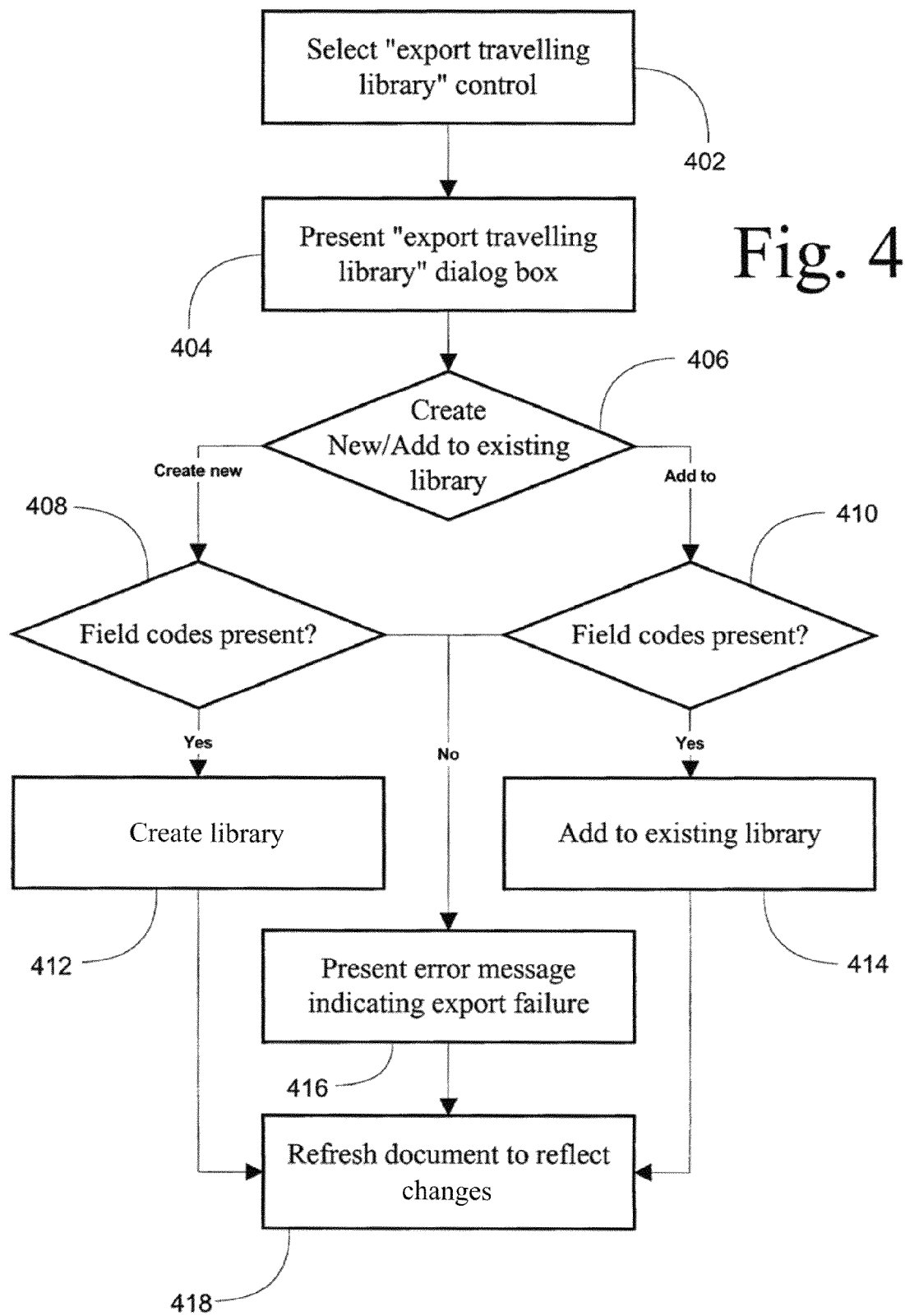
FIG. 4 is a flow diagram presenting a method for exporting a traveling library according to one embodiment of the present invention.

One embodiment of an interface for reviewing citations retrieved from citations libraries as falling within the scope of the citation query through operation of the process presented in FIG. 2 is illustrated in FIG. 3. A search term field 302 is presented wherein citation terms forming the citation query are presented to the author. In this manner, the author is provided with the context of the present query. According to embodiments of the invention, the author may modify the citation terms here and execute the modified citation query against the citation library. Below the search terms is the result set 302, which comprises citation records that fall within the scope of the citation query. Using an input device, the author may select a citation from the result set to review the citation data.

The citation data 306 is presented in a frame occupying the lower half of the interface. The citation data comprises detailed information regarding the reference that forms the basis for the citation including, but not limited to, the reference type, author, year of publication title of the reference and publication, as well as other miscellaneous information. Advantageously, the citation data may further comprise an abstract providing a brief summary or overview of the substance of the reference. This information is useful to an author in determining if a particular reference is the source of the intended citation.

The ambiguous citation currently being analyzed by the software of the present invention may be acted on by selection of one of the provided interface controls. Using an input device, the author may select on of the citations in the result set 304 for insertion into the document. Selection of the insert control 308 inserts the selected citation into the document. Alternatively, the author may choose to ignore 310 the current citation or ignore all of the unformatted citations 312 contained within the document. Likewise, the citation formatting process may be canceled 314. A control is also provided that allows access to a help system 316 that provides answers to questions an author might have regarding operation of the invention.

As described above, authors may compile selected citation data into a local database imbedded within the document in order to enable others to work with properly formatted citations in the document. The process of exporting a traveling library is presented in FIG. 4. Using an input device, the author selects a control provided by the citation editor add-in that executes the export process, step 402. In response to the author command, the software presents an "export traveling library" dialog box, step 404. Using the interface presented by the dialog box, the author may set preferences regarding the manner in which export is performed.

A check is performed to determine whether the author is creating a new citation library in the citation application or adding to an existing library, step 406. Where the author is attempting to export a new citation library in the citation application, step 406, a check is performed to determine if the field codes are still contained within the document, step 408. If the author removes the field codes and replaces them with plain text, the software is unable to invoke export functionality and an error message is presented to the author indicating that the export operation has failed, step 416. Where the software is able to detect the field codes in the document that comprises the citations, a citation library in the citation application comprising the citation data for all the citations contained within the document, step 412.

Where the author is attempting to export citation data to an existing citation library in the citation application, step 406, a check is performed to determine if the field codes are still contained within the document, step 410. If the author removes the field codes and replaces them with plain text, the software is unable to invoke export functionality and an error message is presented to the author indicating that the export operation has failed, step 416. According to one embodiment of the invention, selection of a graphical control provided by the software of the present invention is operative to replace the field codes in the document with the plain text to which the field codes link. Alternatively, the field codes may be manually removed by the author and replaced with the plain text to which the field codes link.

Where the software is able to detect the field codes in the document that comprises the citations, additional selected citation data is added to the citation library in the citation application that was previously embedded into the document, step 414. Regardless of whether the author is creating a new citation library in the citation application or adding to an existing one, program flow is consolidated at step 418 where the software refreshes the document to reflect any changes made by the operation.

Figure 5:
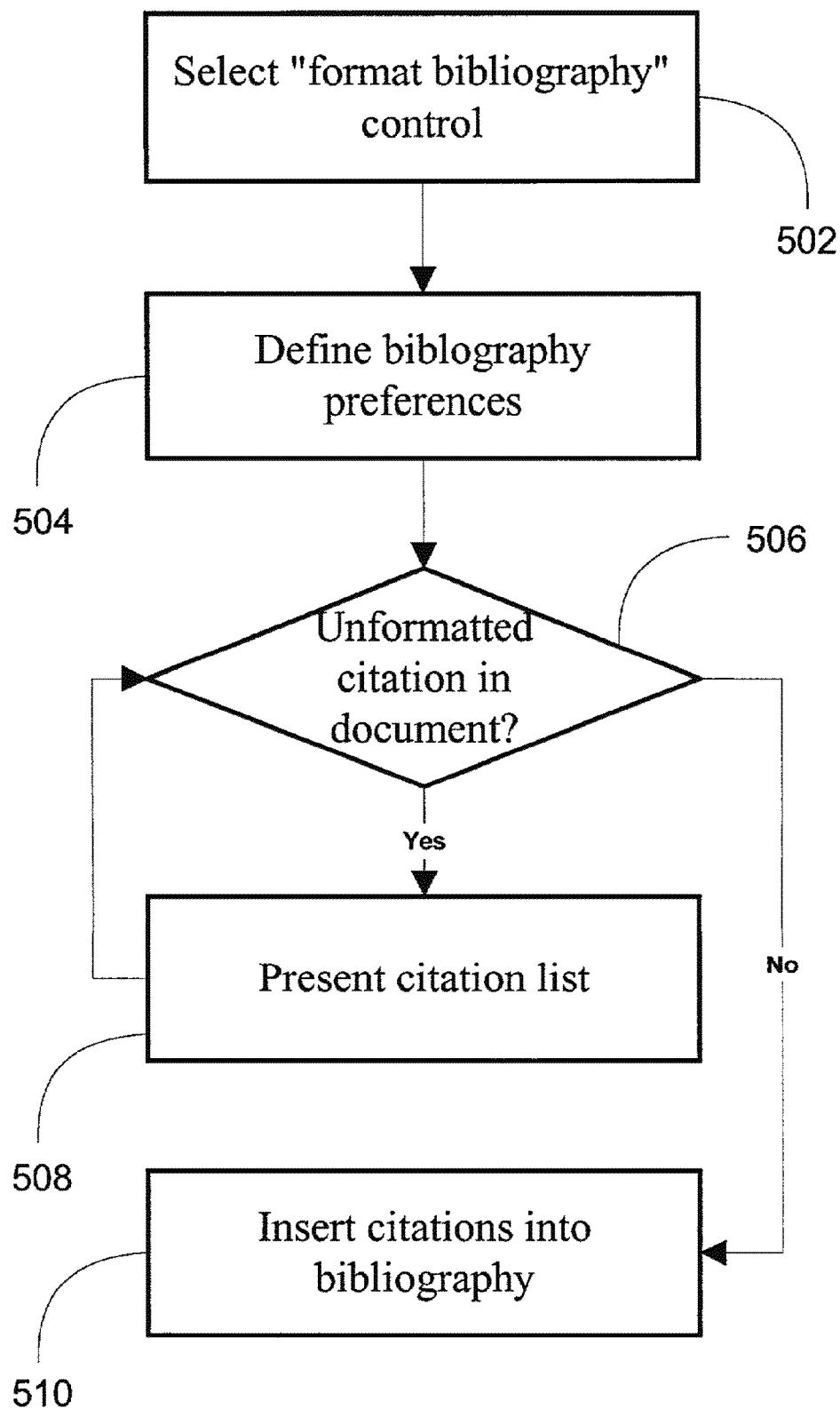
FIG. 5 is a flow diagram presenting a method for generating a bibliography according to one embodiment of the present invention.

The software and methods presented here may also be used to automatically generate a formatted bibliography from citations that are added to a document, as illustrated in FIG. 5.

One embodiment of the bibliography generation process begins when the author selects a control presented by the citation editor add-in that executes the bibliography functionality, step 502. The author is provided an opportunity to define one or more preferences regarding the output style that the bibliography will take, step 504. For example, bibliography preferences include, but are not limited to, font style, size, indentations, starting number for the bibliography, etc. Alternatively, bibliography preferences are set before hand by the author and the software simply reads the defined preferences from a data file at step 504.

The software scans the document to determine if citations exist that are awaiting formatting, step 506. Where unformatted citations are present in a document, a citation list is presented to the author, step 508. Using an input device, the author selects the appropriate reference that is associated with the citation supplied by the user. Program flow returns to step 506 where another check is performed for unformatted citations. That process is repeated for all unformatted citations. Alternatively, a process analogous to steps 208, 210, 212, 214 and 216 presented in FIG. 2 are executed for each of the unformatted citations contained within the document in place of the process of step 508. All of the citations in the document are properly formatted and the software inserts the citations into a bibliography, step 510. It should be clear to one skilled in the art that this process may easily be modified to provide for dynamic updating of the bibliography as new citations are supplied or existing citations are editing, which is considered within the scope of the present invention.

Figure 6:
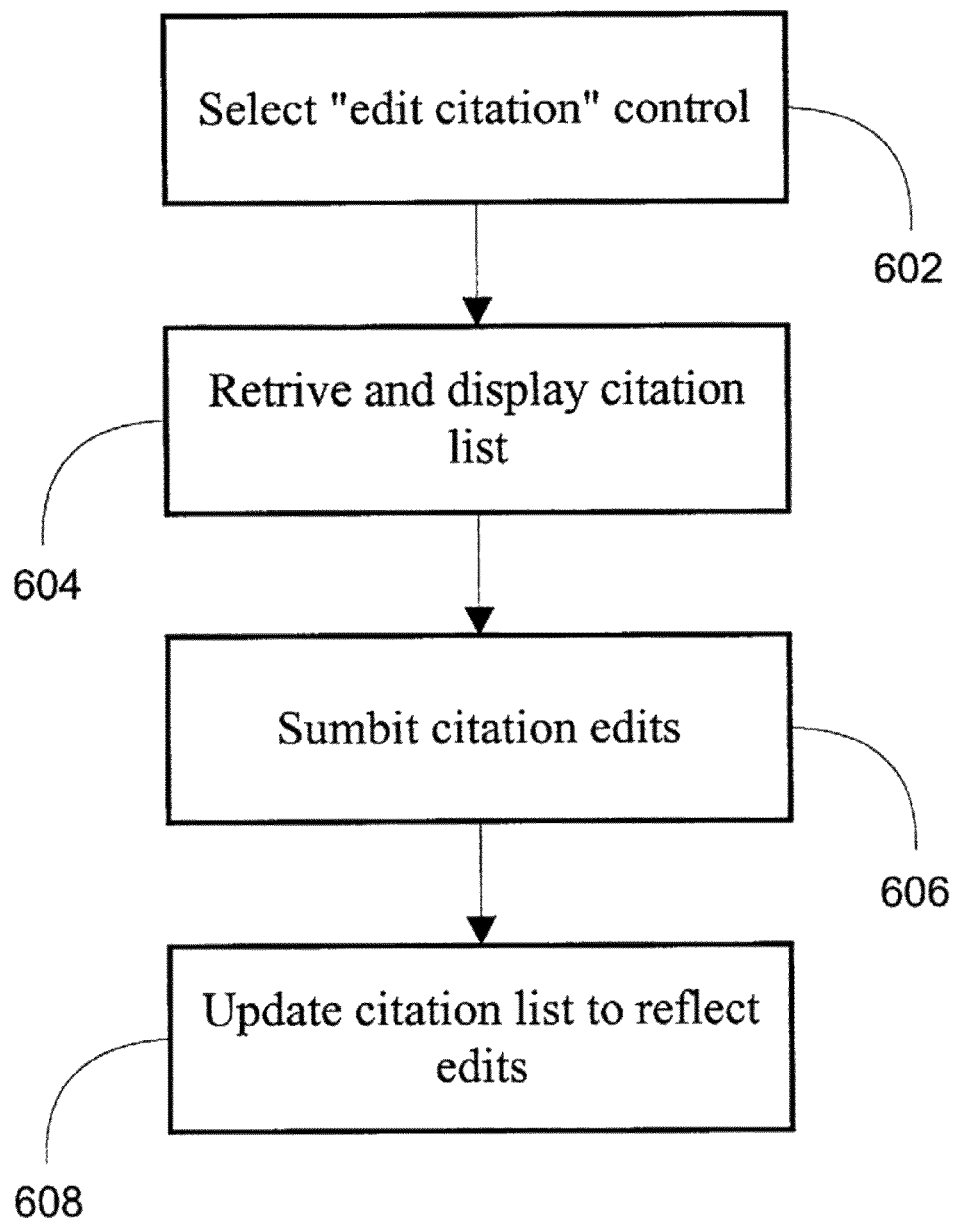
FIG. 6 is a flow diagram presenting a method for editing a citation according to one embodiment of the present invention.

Additionally, an author may edit selected citations that have previously been inserted into a document and formatted, as presented by the method of FIG. 6. An author is provided with graphical controls by the citation editor that supply assistance with the citation editing process, which is selected by the author to being the editing process, step 602. The citation editor add-in transmits a citation edit request to the citation application, which is translated into the native format of the citation application by the shared library. In response to the request, the citation application prepares a listing of all citations contained within the document for presentation to the author by the citation add-in, step 604. Using an input device, the author may supply changes to one or more of the citations in the document. According to one embodiment of the invention, an interface similar to that presented in FIG. 3 is supplied whereby the author is presented with all references that matched the previously supplied citation terms and given an opportunity to modify the citation terms associated with one or more selected citations. Regardless of the method used to receive citation edits, the edits are submitted by way of the shared library to the citation application for recordation, step 606, which may also include modifying the citation list and field codes in the document to reflect the edits supplied by the author, step 608.

Figure 7:
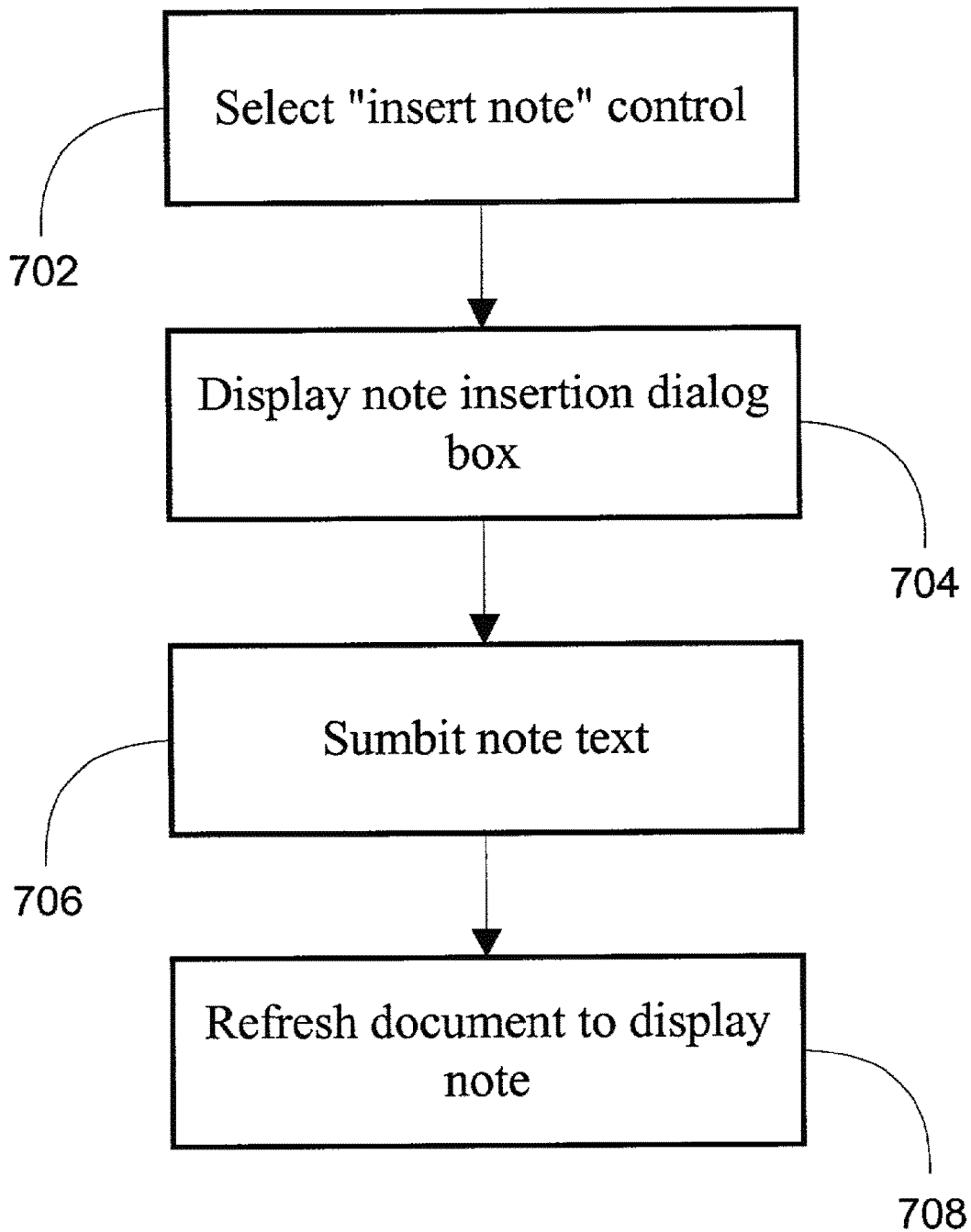
FIG. 7 is a flow diagram presenting a method for inserting a note according to one embodiment of the present invention.

The present invention provides valuable functionality to insert notes into documents; one embodiment of a method for providing such functionality is presented in FIG. 7. When required by a given journal, for example, Science, the author selects a graphical control provided by the citation editor add-in to insert a note, step 702. In response, a note insertion dialog box is presented to the author, 704. The author submits the text of the note into the note insertion dialog box and, when complete, selects a graphical submission control, step 706. The document is refreshed to display the note in the document, step 708. Advantageously, controls are supplied or parameters may be set through which the author may indicate the precise position within the document where the note should appear.

Figure 8:
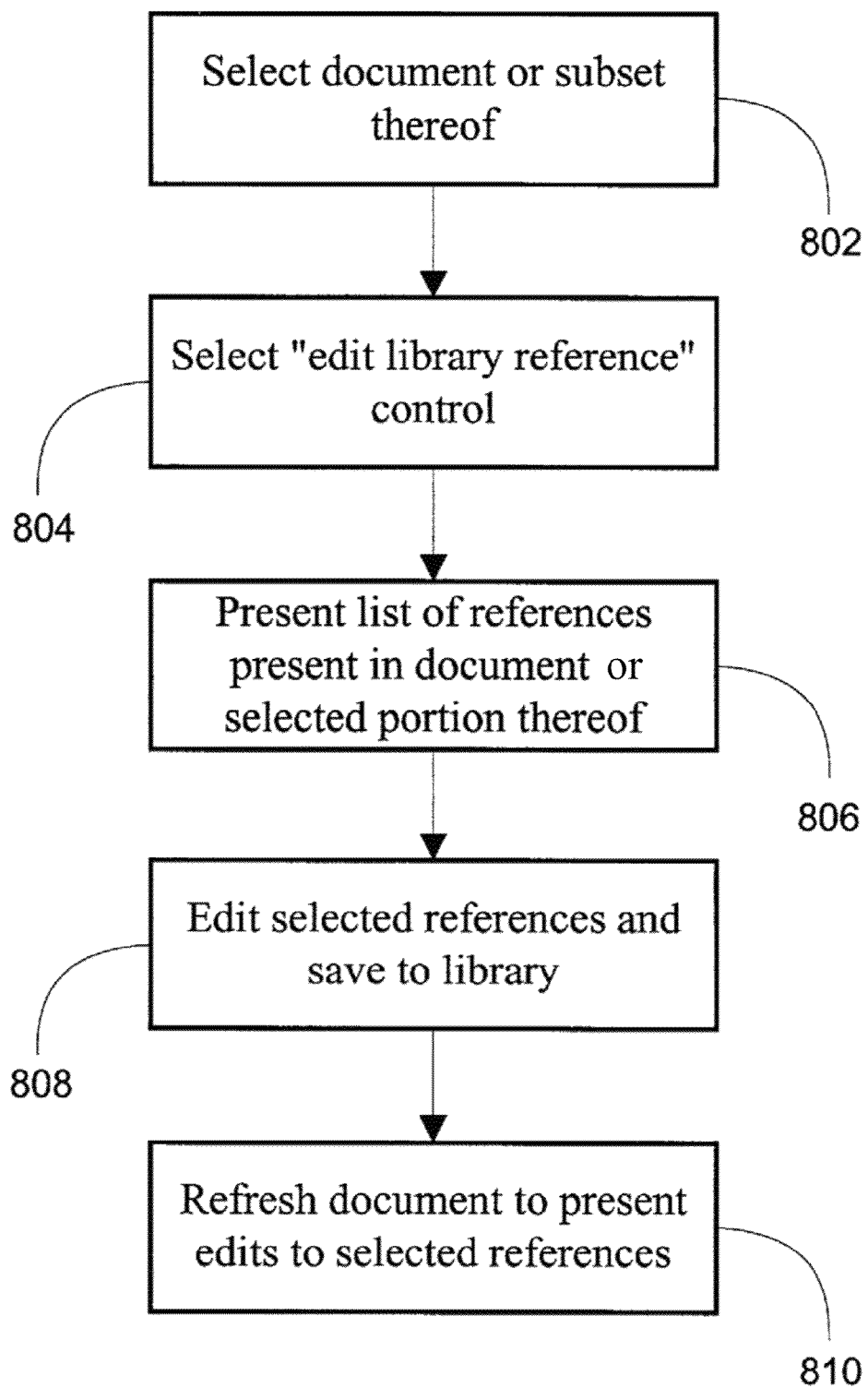
FIG. 8 is a flow diagram presenting a method for editing a library reference according to one embodiment of the present invention.

As previously indicated, an author may elect to use a local citation library in addition, or opposed to, one or more remote libraries. One embodiment of a method for editing references contained in a local citation library is presented in FIG. 8. It should be noted, however, as it is assumed that the author has editing privileges on the local citation library, that the method of FIG. 8 is likewise applicable to remote citation libraries where the author has editing privileges.

In order to edit a reference, the author must select a document or subset thereof, step 802. The minimum acceptable subset of the document is an individual citation. Using graphical controls supplied by the citation editor add-in, the author selects a control to edit the selected references, step 804. Citation data, e.g., information comprising a reference, for each of the citations present in the selected document or portion thereof is presented to the user, step 806. According to one embodiment, the data is presented in a list format.

Using the graphical interface, the author selects references and makes the required edits, step 808. The author may sequentially edit multiple references. The completed edits are saved to the citation library, which may be local or remote, so long as the author has editing privileges on the citation library. The document is refreshed to present changes to the citations contained therein based on the edits made to the underlying references, step 810.

Figure 9:
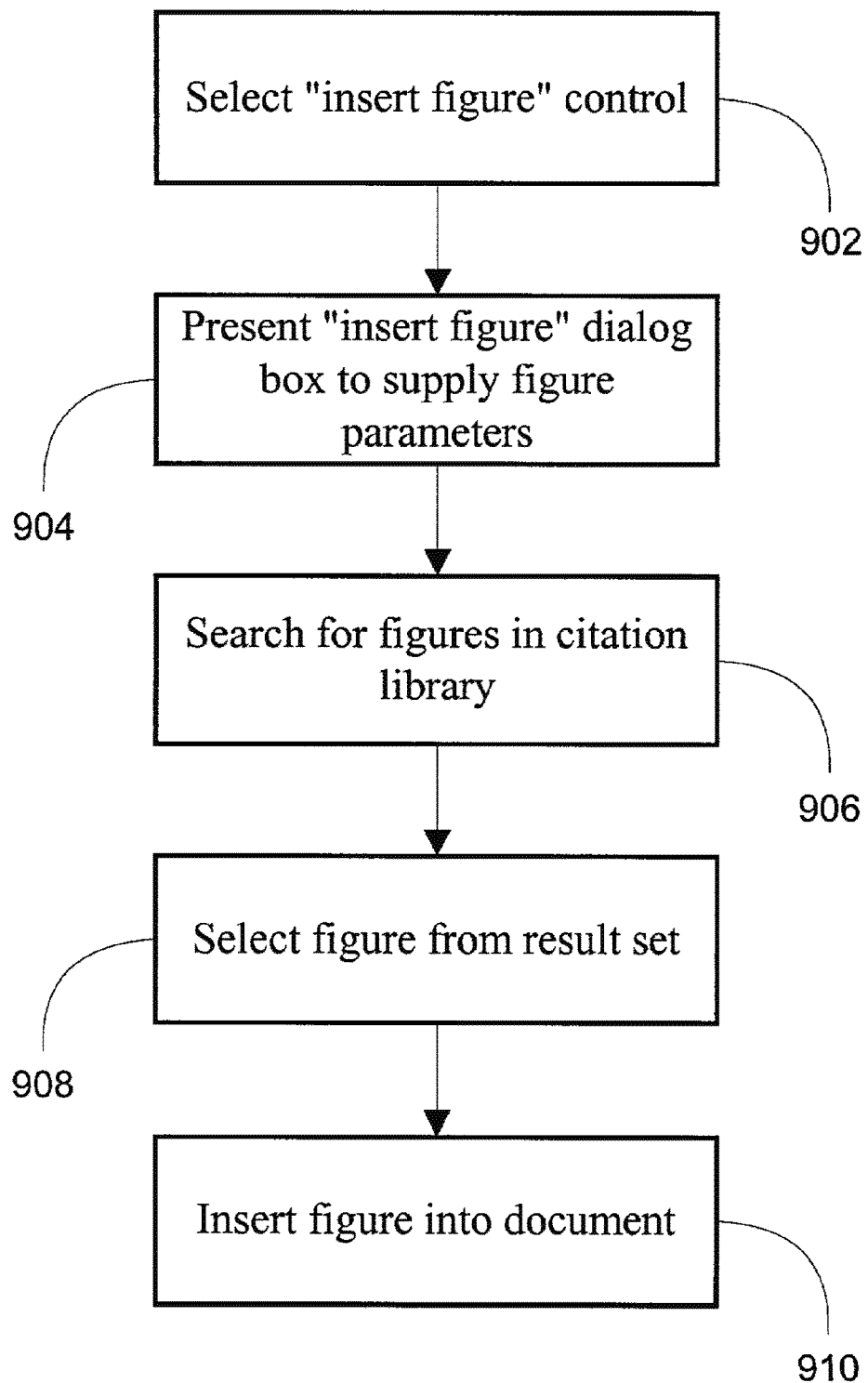
FIG. 9 is a flow diagram presenting a method for inserting a chart or diagram from publication into a document according to one embodiment of the present invention.

Turning to FIG. 9, a process is presented that allows an author to insert a graphic from a publication, such as a chart or diagram, into a document. Using the graphical interface provided by the citation editor add-in, the author selects a graphical control to insert a figure or diagram from a publication into the document, step 902. In response to the selection of the control, the citation editor add-in presents an insert figure dialog box, step 904. Using the graphical controls presented via the dialog box, the author enters one or more parameters identifying the desired figure. For example, the author may supply a publication, an author, an article title, publication date, or other data that may uniquely identify the desired figure.

Using the data regarding the desired figure that is supplied by the author, a figure query is prepared that is used to search one or more citation libraries for the desired figure, step 906. A result set comprising figures contained within the citation databases that fall within the scope of the figure query is presented to the user, step 908. Using an input device, the author selects that appropriate figure from the list of presented figures. The selected figure is inserted into the document and presented to the author, step 910. Alternatively, the figure parameters may be supplied as a temporary citation and automatically formatted according to the process presented in FIG. 2.

Figure 10:
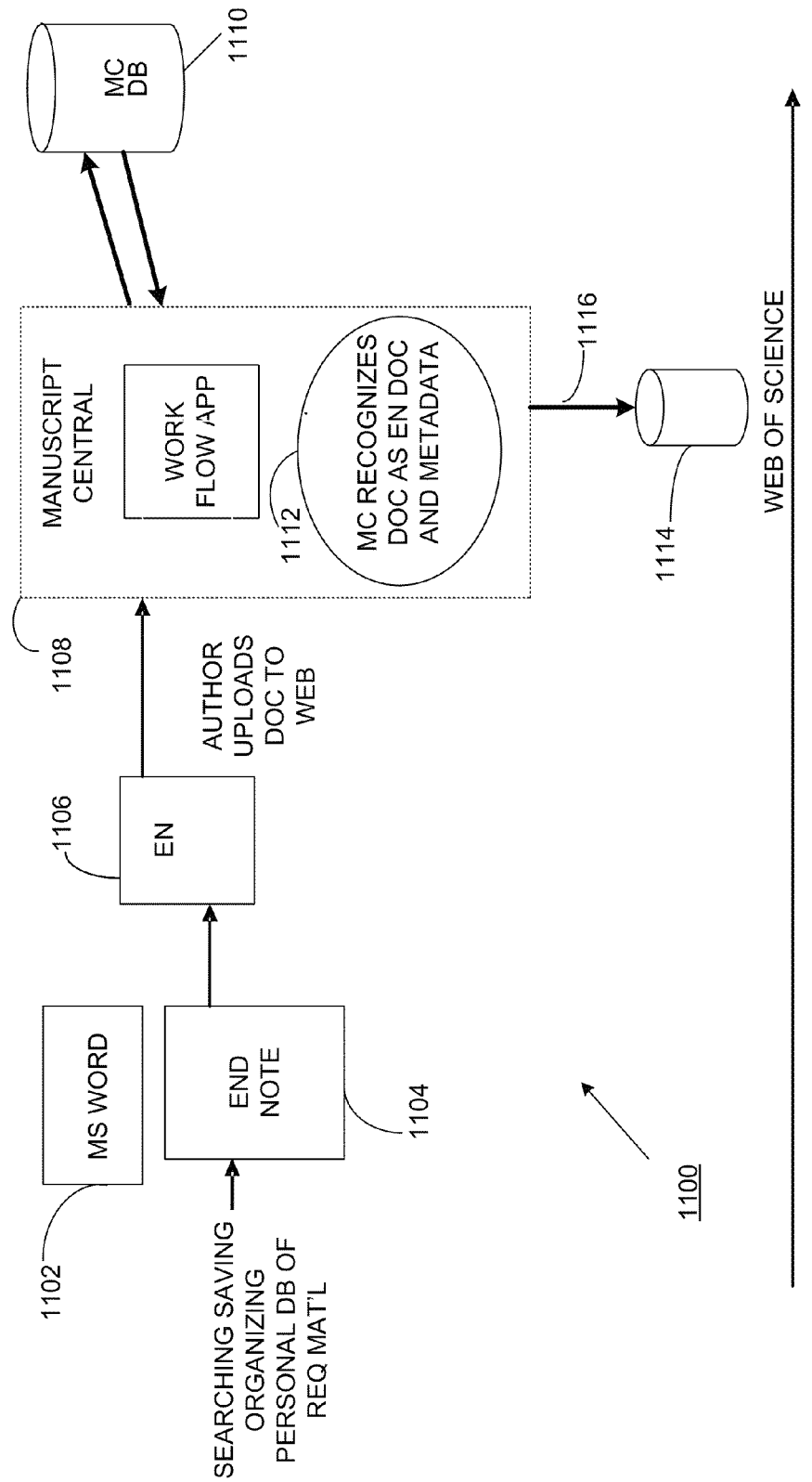
FIG. 10 is a schematic diagram illustrating a first exemplary system for tagging, extracting, and validating cited references using the present invention.

With reference to FIG. 10, an authoring, submission, and validation system 100 includes a word processing application 1104, e.g., EndNote using EndNote XML reference mark-up, for preparing structured formatted documents. The software application 104 is used to format the Microsoft Word document 1102 by identifying and tagging data contained in the document prior to submission to a publisher. For instance documents may be marked or tagged using, by way of example only and not limitation, processes based on GML, SGML or XML. By marking or tagging the document to create a structured document, e.g., using GML, SGML or XML based mark-up, the cited references may be more easily extracted from the document and included in a reference list for validation. SGML, Standard Generalized Markup Language, is a generic markup language used to represent documents in content and structure. SGML identifies document elements such as titles, paragraphs, tables, and chapters as distinct objects and allows users to define relationships, defined in a Document Type Definition (DTD), between objects for structuring data in documents. SGML may be compared with SQL (standard language for creating, updating and querying relational database management systems) in that SGML document elements and structure are analogous to a collection of field definitions in a database. SGML enables users to structure information in documents in an open fashion to permit access and reuse by any SGML "aware" application across multiple platforms. Once converted into SGML, the document has tagged information and becomes a database-like document that may be searched, printed and processed by SGML "aware" applications in an open fashion. Extensible Markup Language (XML), a simplified dialect of SGML, is a markup language for representing documents and is suitable for use on the World Wide Web (WWW). XML provides a relationship between a document's content and embedded structure and a way to share document-based information across applications and platforms. Structured information may have multiple components, e.g., words, and pictures, and include indications as to what the content represents, e.g., title, section heading, footnote, endnote, reference, caption, and database table).

In keeping with the invention, a structured document may be formatted according to specific bibliographic style using application 1104 functions. For instance, the EndNote Tool Bar may be invoked to call up APIs (application programming interfaces) of MS Word hidden code fields. The structured Word document 106 may be loaded or uploaded into a work flow system 1108, e.g., Manuscript Central, that is in communication with a database 1110. The system 1108 includes software 1112 for recognizing the structured document 1106 as being formatted in a particular way, e.g., EndNote, then it may pull or extract the references contained in the document 1106 using means for parsing the data using a reference XML, e.g., EndNote XML reference. For example, the cited references may be parsed from the document and included in a reference list for validation. System 1108 preferably is capable of recognizing multiple formats and extracting references structured in a variety of formats. For those documents that are not structured, prior to the validation process a manual operation or software-aided operation may be applied to a document to identify and extract cited references or portions of text. Once the reference data is extracted or otherwise placed in a condition for comparison, one or more database links 1116 are established to compare the extracted reference data against valid reference data contained in the one or more external database 1114, e.g., WoS. Database 1114 serves as an authority database containing verified and reliable reference data. Rather than establishing a link to an external authority database, a reliable database may be present local to the work flow system 1108, e.g., database 1110.

The system 1100 may apply an automated process to parse out data to be validated from documents that are structured and that have metadata tags that identify the cited references. In the "extraction" process the parser preferably recognizes or has access to the one or more formatting syntax, e.g., EndNote reference XML, used to code or format the document by the application 1104 and is capable of identifying those fields in the document that are associated with a cited reference or other field of interest. The system 1100 may include "parsing" options to select a parser or a parser set-up appropriate for the source of the document or the source of the formatting. Also, journals or other publishers may require submitting authors to submit papers pre-formatted using a particular reference management mark-up strategy.

Figure 11:
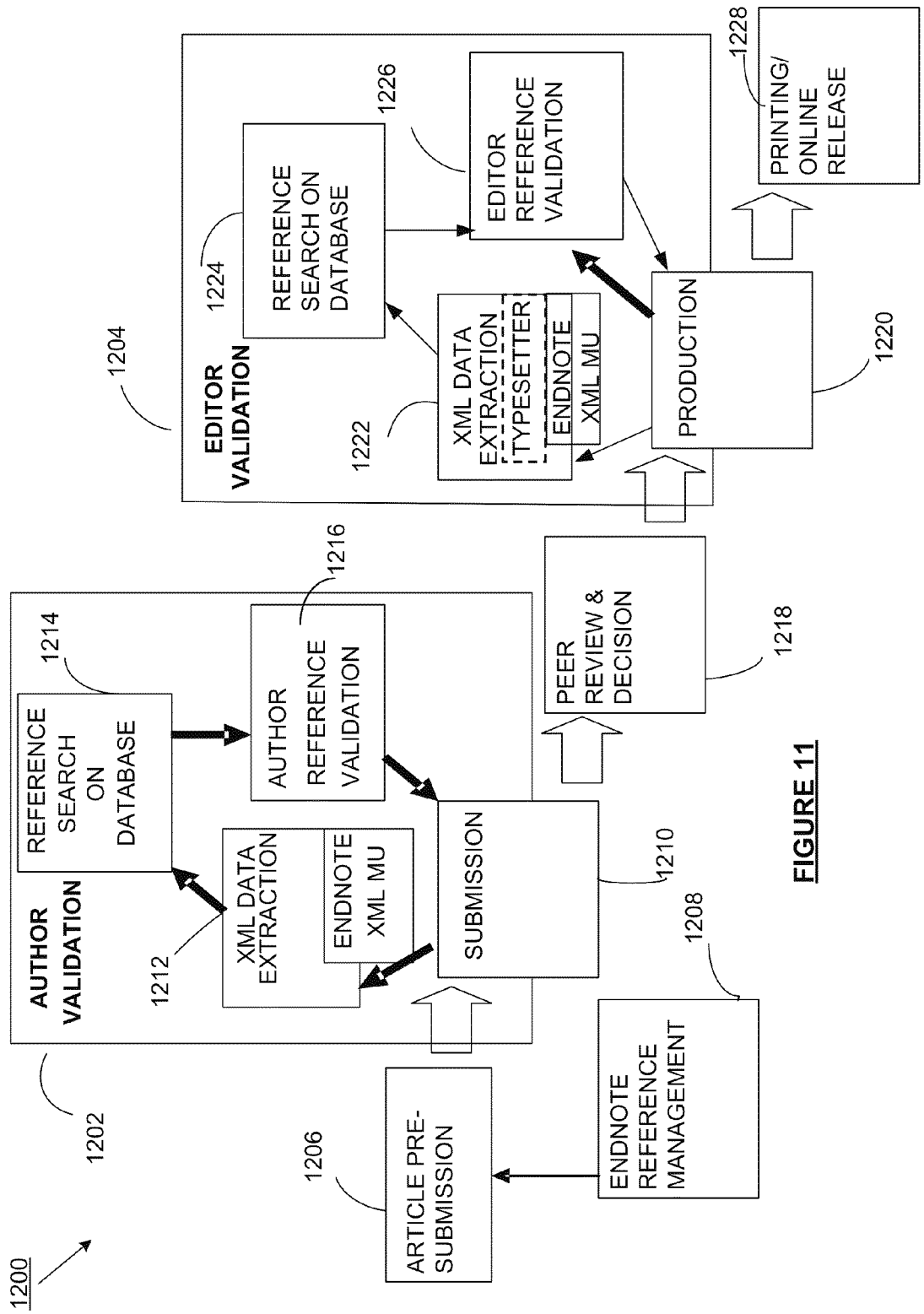
FIG. 11 is a schematic diagram further illustrating reference extraction and validation techniques of the present invention.

Now with reference to FIG. 11, the validation process, generally referenced as 1200, may be carried out prior to submission by author validation 1202 and/or it may be carried out after submission by publisher/editor validation 1204. In the author validation process 1202, initial review and validation is carried out by the author prior to manuscript submission 1210. Author validation 1202 may be followed by secondary review and validation by a production editor or other actor associated with the publisher post submission. In the Editor validation process 1204, the submitted document is reviewed and validated by a production or copy editor. Ideally, journals and other publishers would prefer authors to perform the initial validation as essentially validating the manuscript's cited references prior to submission. However, cost and difficulty associated with parsing cited references into XML at the submission stage may deter authors from taking on this added burden. In addition, a publisher may desire to retain the practice of using a typesetter to markup references. However, as more effective author tools become widely available and used and as the creation, submission and validation processes become more integrated and/or open, the many benefits automated validation has to offer are likely to outweigh and supplant prior practices.

Referring to FIG. 11, the following major components comprise the author validation system 1202. A reference management module or service 1208, e.g., EndNote, may be used to produce a structured document with tagged references prior to submission 1206. Alternatively, third-party XML production software and services may be used to automate the markup process. Extraction based on the XML production software used and the tagging format occurs pre-submission to allow author validation. At article submission block 1210, the document, structured or not, may be handled in either of two ways. The document may be passed directly on for peer review and decision at block 1218 and then submitted to a publisher at Production block 1220 without pre-submission author validation. Alternatively, for self-validation by the author, the document may be processed by XML data extraction block 1212. The cited reference data may be extracted using a number of different methods, including EndNote reference XML for a document formatted using the EndNote process. Also, a software module may process the document to identify references and extract them into XML. In one manner, the extracted reference data is compiled into a reference list. Reference lists may be held in detailed and standardized XML. Getting the reference list into XML may be dependent upon the markup language used to produce the structured document. Tables 1 and 2 below, depict an excerpt from a document marked up using EndNote Reference XML. Table 1 shows the excerpted text without the mark-ups and Table 2 shows the same excerpted text with mark-ups.

TABLE 1

A large number of extracellular mediators and their corresponding receptors have been established to induce mechanical hyperalgesia (Woolf & Slater, Jun 9; Julius & Basbaum, Sep. 13, 2001). However, the underlying intracellular signaling mechanisms remain to be explored in detail. We investigated the mechanism by which the endogenous mediator estrogen modulates PKC-dependent inflammatory hyperalgesia.

TABLE 2

A large number of extracellular mediators and their corresponding receptors have been established to induce mechanical hyperalgesia (Woolf & Salter, Jun 9; Julius & Basbaum, Sep. 13, 2001). However, the underlying intracellular signaling mechanisms remain to be explored in detail. We investigated the mechanism by which the endogenous mediator estrogen modulates PKC-dependent inflammatory hyperalgesia.

Preferably, the XML extraction block 1212 is configured to recognize and process documents marked-up in multiple formats and to accommodate documents from a variety of reference management software or XML production software. In this manner the system 1200 facilitates a range of client needs and does not require the client to abandon elements of their workflow. The extracted reference data output from block 1212 is compared against an authority database at Reference Search on Database block 1214, which may involve online access to one or more authority databases, and then the validation results of the comparison are presented to the author/user via Author reference validation block 1216. The author/user may then take action based on the results, including submitting the paper with the results to the publisher. One goal is to have the validation process recognized within the publishing industry so that a favorable validation report would amount to a "seal of approval" widely accepted by publishers such that a high level of reliance is placed on the results and additional manual or automated validation is not required by the publisher.

The validation results may include confirmation of correct references validated as having actual papers corresponding to the cited reference data. The system can give an indication of verification, identify which references have or have not been validated, delineate the data or fields in the cited reference or document that appear to be incorrect, and suggest closely matching reference data as a substitute or correction for the erroneous data. The system can also include hyperlinks, for example, associated with the cited references to directly link the results page with the actual, confirmed reference or a suggested reference. The system can also give authors the ability to revise, edit, or correct cited reference data and resubmit for further validation. The invention is not limited to validating authors, citations, dates, etc. and can be used to validate any feature appearing in a cited reference or even a paper for which there is a corresponding authority database against which the data may be compared. For example, if an author claims to be a "Fellow" or "Member" of a society, e.g., IEEE, or a member of the faculty of a school or in a chaired position, for example, then as long as the system 1200 has access to an authority database of membership data for that society or faculty, the information from the paper or other document may be extracted, marked-up or otherwise, and may be compared against the database and the data validated. In addition, these processes may be used to validate that the paper has not previously been published. As part of the process, a user can select from a list of databases against which the validation process is to be performed or the system may default to a predefined set of one or more databases. Exemplary databases for use with the present invention include public reference databases, e.g., CrossRef, and National Library of Medicine (NLM) PubMed; commercial databases, e.g., ISI Web of Science (WoS), ISI Web of Knowledge (WoK), and BIOSIS; and privately held specialized and other databases, including Dialog, library Online Public Access Catalogues (OPACs), Medline, ProQuest, Ovid, Ebsco, and WilsonWeb and similar reference databases.

In the event a document is not author self-validated and is merely passed on to the publisher for Editor Validation 1204 via Production block 220, then the publisher may validate the cited references contained in the submitted document. XML data extraction block 1222 works essentially the same as corresponding block 1212 previously described in the author validation process 1202. In addition to the EndNote reference management software and third-party software previously discussed, publishers often use typesetters to extract reference data. This option is reflected in block 1222. The extracted reference data from block 1222 is compared against an authority database at Reference Search on Database block 1224, as previously described for block 1214, and then the validation results of the comparison are presented to the editor/user via Editor reference validation block 1226. Alternatively, the paper may be submitted along with a list of references, or the list may be submitted apart from the paper, and the list may be processed for validation. In addition to the description of the comparison results and actions above, the publisher/editor may send some or all of the results back to the author or to another for follow-up, e.g., correction or further verification.

Preferably, reference databases used for validation are local or available via the Internet or other communications network to allow the Author Validation 1202 and Editor Validation 1204 processes to search on them. Traffic requirements are likely to be significant as for example using an average 60-80 references per article times 1,800 articles per day yields on the order of 100,000 to 150,000 requests per day. User interfaces (UI) support the validation task of reviewing reference matches and indicating which matches are correct and which are not. Two exemplary versions of UIs are author UI and editor UI. As part of the author pre-submission process 1206, reference management process 1208, or author validation process 1202 or as part of the editor validation process 1204, metadata, tagging or links, e.g., DOIs (digital object identifiers) or URLs, may be inserted or validated to provide or confirm cross-publisher/database linking imbedded in the final paper or bibliography. Other elements associated with the validation process include search logic for reference retrieval from database.

Figure 12:
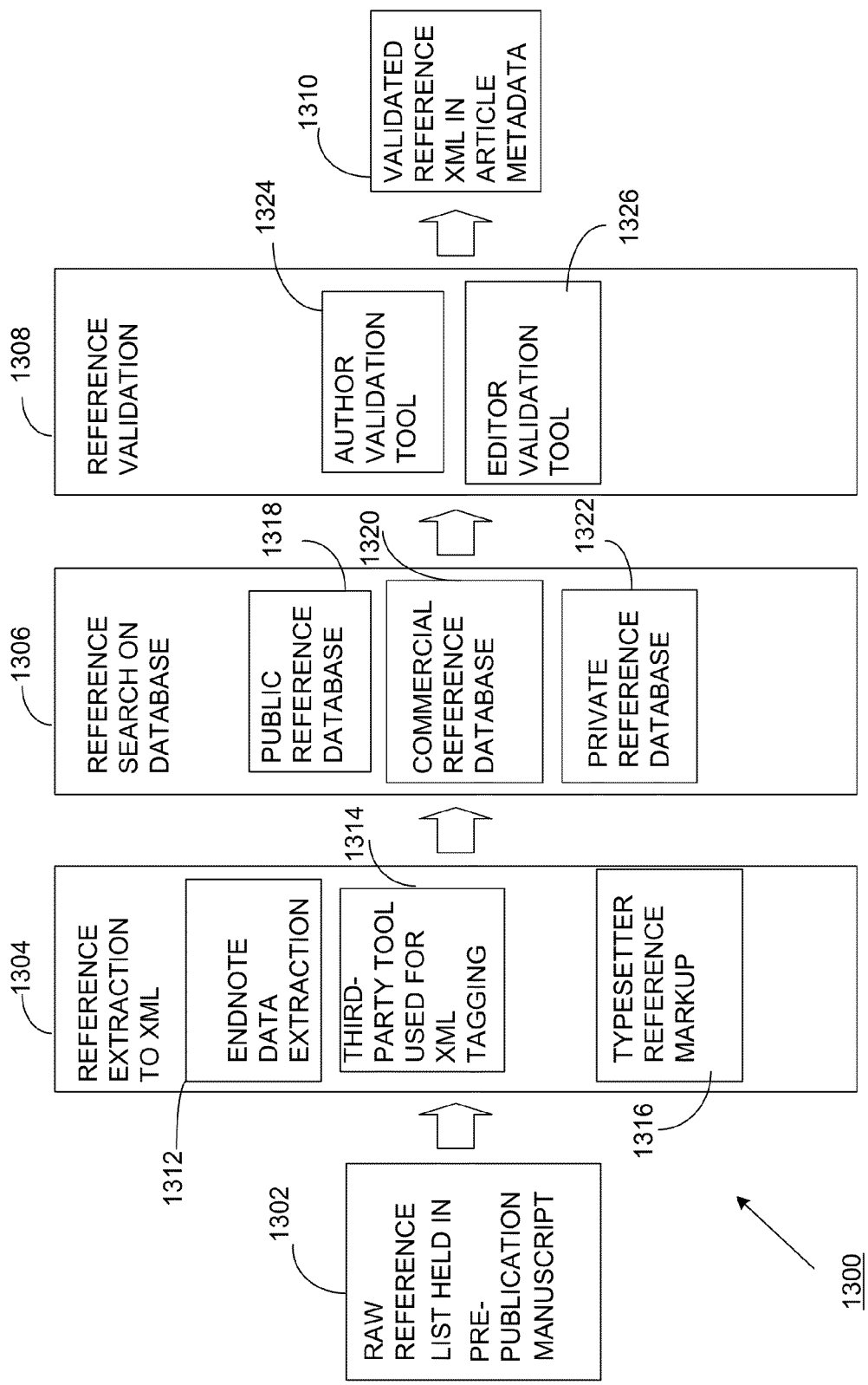
FIG. 12 is a schematic diagram illustrating reference extraction and validation techniques of the present invention.

Now with reference to FIG. 12, another depiction of a submission and validation process 1300 is shown in which block 1302 represents a pre-publication "raw" reference list that is input to and processed at block 1304 wherein the references are extracted to XML. After the reference list is extracted into XML, the references are compared at block 1306 against one or more authority databases, e.g., WoS, WoK, PubMed, OPACs, and CrossRef. Next, the results of the reference comparison are presented for further validation as represented at block 1308. After the final validation by the author/editor, the validated references or list of references in XML are included in the article/manuscript metadata at block 1310. At this point the document is ready for submission to a publisher (if author validated) or ready for publishing (if editor validated).

With respect to block 1304, the references or reference list may be extracted to XML consistent with one or more reference management module, structured format, or service utilized. For instance, a paper and reference list prepared using EndNote, would rely on an EndNote data extraction 1312. Alternatively, third-party XML production software and services may be used for XML tagging 1314. As relates to the publisher perspective, a third-party typesetter may be used to convert the cited reference data to XML structured format as represented at block 1316.

The extracted reference data from block 1304 is compared against one or more authority database at Reference Search on Database block 1306. The reference databases used for validation may be local or available via the Internet or other communications network and as described elsewhere herein. Exemplary databases for use with the present invention include public reference databases 1318, e.g., CrossRef, and PubMed; commercial reference databases 1320, e.g., Web of Science (WoS), Web of Knowledge (WoK), and BIOSYS; and privately held specialized reference databases 322. Other exemplary databases include: Medline, ProQuest, Ovid, Ebsco, and WilsonWeb.

With respect to Reference Validation block 1308, the validation results of the comparison block 1306 are presented to the author/editor/user for examination and/or for taking action based on the results. User interfaces, as described above and generally known, may be used as part of Author validation tool 1324 and/or Editor validation tool 1326. Author action may include submitting the paper with the results to the publisher. Editor action may include approving the paper for publication or returning the results to the author for correction or explanation. Action may also include confirmation of correct references validated as having actual published papers corresponding to the cited reference data.

After reference validation 1308, the validated references or list of references in XML may be included in the article/manuscript metadata at block 1310. With respect to author validation, the article/manuscript with tagged XML references may be submitted to a publisher for acceptance or further validation such as for quality assurance by the publisher. With respect to editor/publisher validation, the article, with tagged references, is ready for approval and publishing—at least with respect to having a validated set of references cited in the paper.

Figure 13:
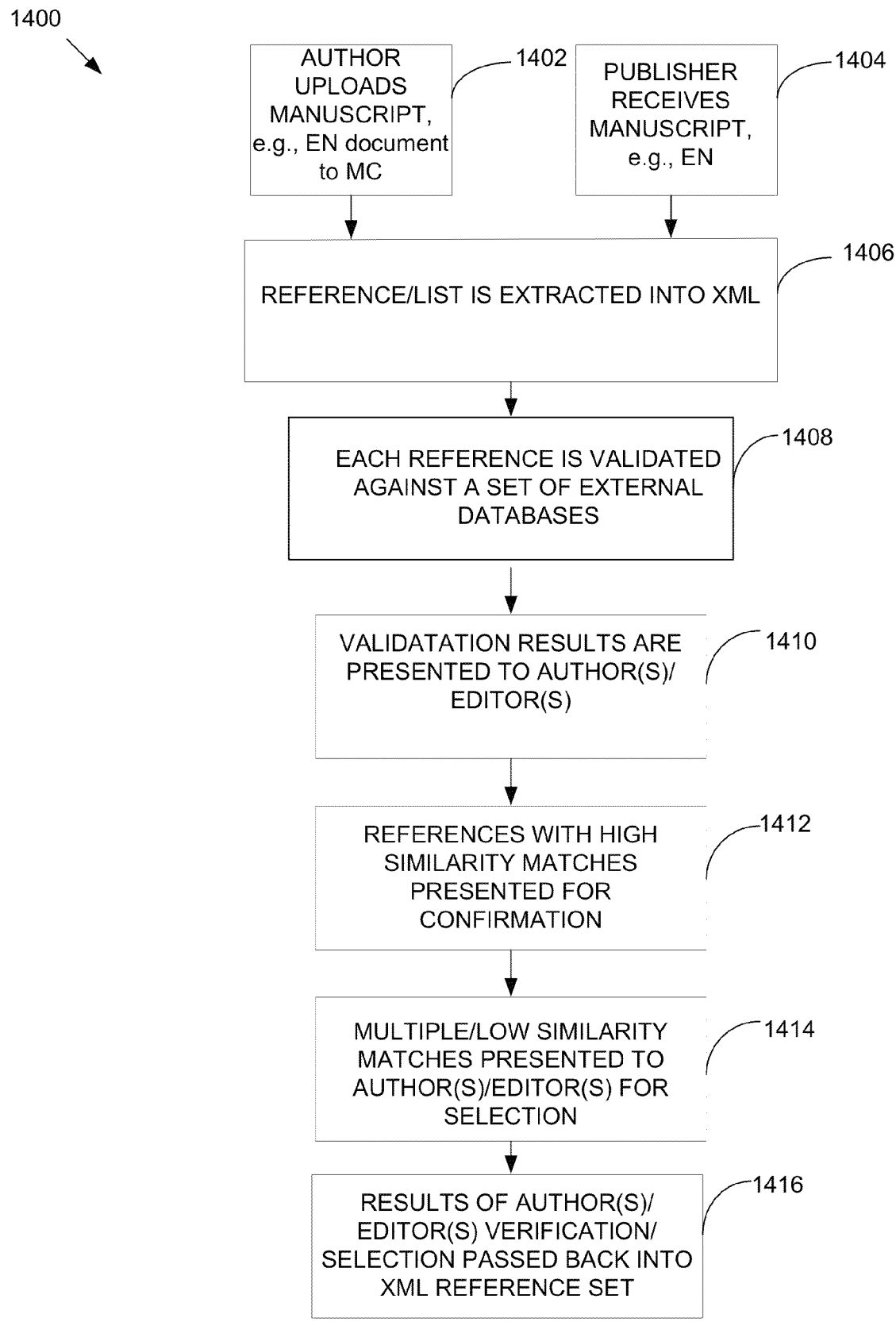
FIG. 13 is a logic flow diagram further illustrating reference extraction and validation linking techniques of the present invention.

With reference to FIG. 13, a dual path flow chart is provided that illustrates one exemplary embodiment of a reference validation process using the present invention. As shown, reference validation process 1400 may be initiated by an author at 402 who may upload a manuscript structured, for example using EndNote, to a central service, for example Manuscript Central, for reference validation prior to submission to a publisher. Alternatively, a publisher may initiate the process at 1404 post submission and in the production phase prior to publication. Other than the initial steps of 1402 and 1404, which is directed to the source of the paper and the entity performing the reference validation, the remaining steps are essentially the same for both paths. Depending on whether an author has conducted an initial validation process or submits the paper or reference list in a recognized structured form, e.g., EndNote, or in an extracted condition, some of the steps may not be necessary for the editor.

At step 1406, references are or a reference list is extracted from the document into XML, preferably based on a known and recognized format structure. At step 1408, each extracted reference is validated against a set of one or more external databases, such as journal-configured database. At step 1410, validation results are presented to authors and/or editors and may include references which have high similarity matches, step 1412, and references having multiple or low similarity matches, at step 1414, presented for confirmation by the author or editor. At step 1416, results of author verification/selection are passed back into the XML reference set.

Figure 14:
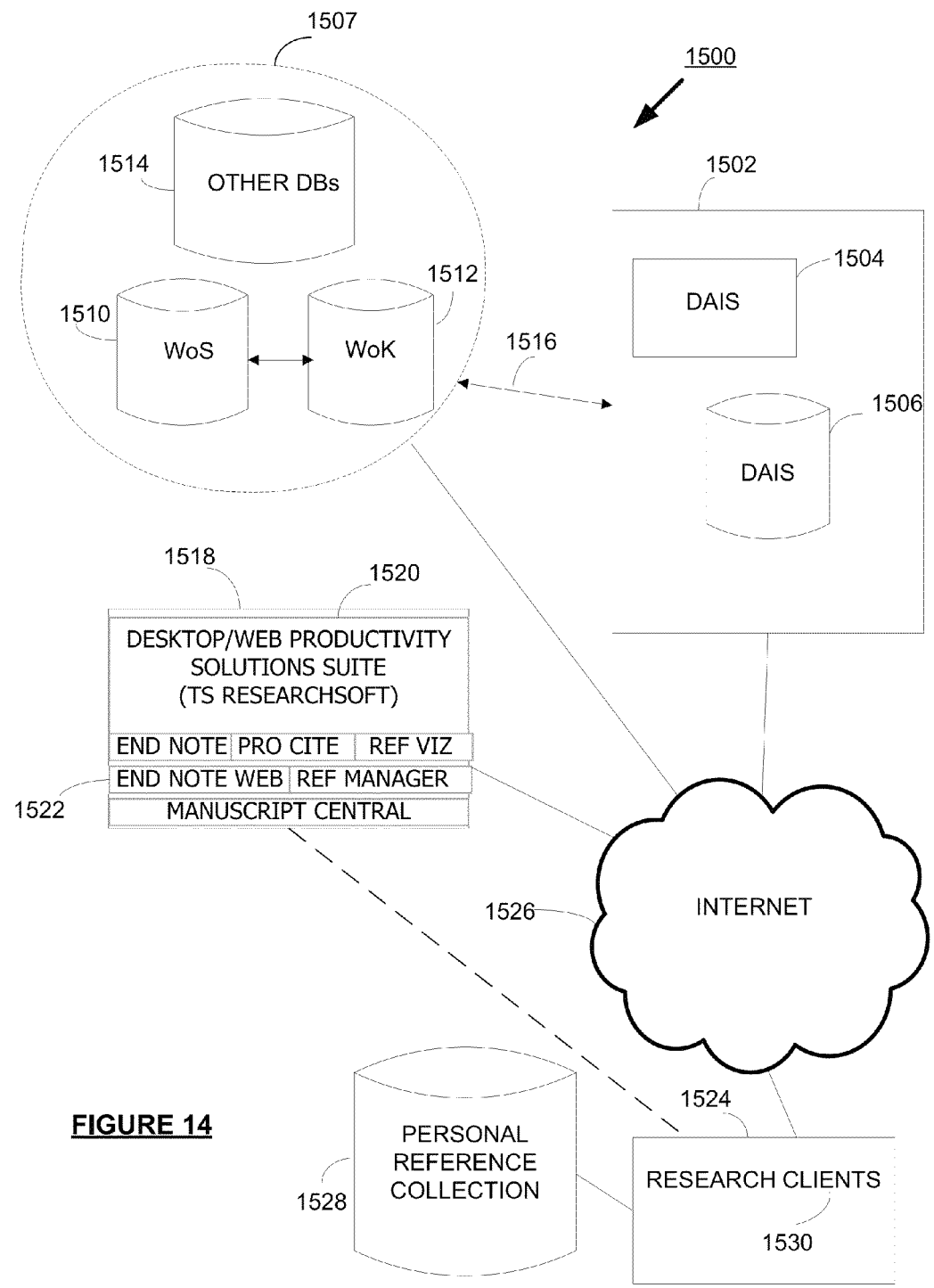
FIG. 14 is a schematic diagram of an authoring, submission, and validation system utilizing the reference extraction and validation techniques of the present invention.

With reference to FIG. 14, one exemplary embodiment of a Content Management System (CMS), referenced generally with reference number 1500, includes a "Distinct Author Identification System" (DAIS) 1502, also referred to as an Author Disambiguation System, a source of information 1507, e.g., databases 1510, 1512 and 1514, software and processor driven user productivity suite 1518, a plurality of remote users or clients 1524 and various communications links. CMS enables users to search for, identify and access items, such as papers and other publications, by certain attributes associated with those items. For instance, a typical user search is based on author name often and only includes author last name and perhaps first and middle initials. This abbreviated and non-unique author information does not uniquely identify the author from the universe of author names contained in the source or database. The purpose of DAIS 1502 is to disambiguate records stored in source 1507 to, among other things, identify distinct authors; assign author identifiers (ids) to them; and tag their authorships with their author ids to facilitate such searching by users 1524.

In this exemplary embodiment of FIG. 14, the sources available for searching include the WoS Database 1510, the WoK Database 1512 and a general reference to other databases of interest 1514, such as OPAC, CrossRef, and PubMed databases and others mentioned herein for example. The DAIS 1502 communicates with stores 507 via a communications link 1516 and captures and uses for disambiguation processes instances of all or portions of such databases. The DAIS 1502 applies the DAIS rules and processes, referenced generally by reference number 1504, against the records stored in such databases to arrive at accurate relational links and clusters of links to properly associate with author entities.

For purposes of explaining the overall process and not by way of limitation to the invention, the WoS DB 1510, for example, is an XML database that spans a range of years of data, including scientific papers and citations associated therewith. The WoS DB instance used by DAIS 1502 is separate from the WoS DB 1510, which may be used by WoS customers and which is kept for independent and unaltered research, testing or various special processing. There are two principal unit records in this database. They are <item> (source item) and <ref> (reference item).

Once the DAIS 502 has applied its processes 1504 against and across the database instances from sources 1507, it may load onto such databases 1510, 1512, and 1514 the disambiguated records and data as a way to improve the integrity of the information stored in such databases and for subsequent use by users. For instance, users, such as remote users 1524 and others, may invoke productivity solutions 1518, such as Thomson Scientific's ResearchSoft suite, in carrying out the business of science and research and in authoring works associated with those efforts. These productivity tools may be desktop-based, network-based or a combination thereof and may be involved in the process of creating a manuscript for publication. For example, the user may use EndNote and other productivity tools to create a structured document using XML references which may be validated, e.g., by comparing against sources 507. Also, such productivity tools may be used by administrators, such as faculty and university administration, in conducting the business of the institutions, for example in reviewing the work of faculty up for tenure and under review, including checking the validity of cited references contained in papers authored by a faculty member under review. Researchers may keep a personal reference collection 1528 of works of their own, of works relied on and referenced in their works, and of works of interest in their particular fields of study.

The invention as described herein in the various embodiments provides one or more of the following features. Find and insert citations, which provides a user interface to search for references from a reference library and insert them in a document. Format citations, which format a document's inserted references to provide both an in-text citation and a bibliography formatted according to a specific set of rules. Scan for temporary citations ("Instant Formatting"), which provides a background scan detects and parses temporary citations (expressed using a specified syntax), looks them up in a reference library, and inserts and formats matching references. Traveling Library, which stores reference data as field codes within a document, allowing further formatting without needing to re-locate the references in an external library. These references can also be exported to a new reference library. Formatting Preferences, which provides a user interface to allow users to customize CWYW behavior. Local vs. online reference library, with which references can be looked up in a library on the user's machine, or in a database hosted on a network or on the Internet. Resolving ambiguous citations, which provides a user interface to allow the user to select from among two or more references that match a search query or a temporary citation. Editing citations, which provides a mechanism to edit citations so as to fine-tune their formatted appearance or update reference data. Inserting notes, which provides a mechanism for inserting notes into a document. Inserting figures, which provides a mechanism for inserting figures and captions into a document. Output styles, which provides a mechanism for encapsulating each set of formatting rules (associated, for instance, with individual publications or professional organizations) within an individual file that can be used by the formatting tool. Remove field codes, which provides a mechanism for removing all supporting data (reference data stored in field codes, etc.) from a document, leaving only the formatted references and author's document content.

Still further, the invention in the various embodiments may provide the following set of features. Source application or reference library switching, which provides a mechanism to insert and format citations from any of two or more identical reference libraries (for instance one on a local desktop and one on the Web). This enables users to store an identical reference library in a desktop database and on the Web and insert references into a document from either location. This mechanism has the further advantage of seamlessly format and update citations from either source application. Microsoft Word citation import, which provides a mechanism to harvest citation data, including XML citation data, inserted into a document by a built-in word processor functionality, e.g., Microsoft Word 2007 or later, and to convert this into an in-document data format. Section bibliographies, which provides a mechanism to identify section markers within a document and to create separate bibliographies at the end of each section, with or without a complete bibliography at the end of the document. Composite citations, which provide a mechanism for treating a group of references as one composite citation, grouped together as one entry in a bibliography and distinguished individually by specific alphanumeric labels as specified by a given set of bibliographic formatting rules. Link from citations to bibliography, which provides a mechanism for navigating to an entry in a bibliography by clicking on an in-text citation, e.g., its citation in the body of a document, which may be treated as a hyperlink for this purpose. Generate an organizational group in source reference management application, which provides a mechanism to automatically create, within the source reference management application, an organizational grouping of the references being used in a document, which grouping is then updated automatically as references are inserted into the document or deleted from the document. Manage references from multiple libraries, which provides a mechanism to allow and support inserting references into a document from multiple reference libraries, and provides a user interface which indicates the source library for each reference and allows the user to update individual references from their source library or to replace a reference with a version from another reference library. Fast switching between in-text citation formats, which is a mechanism for quickly switching between two or more available formats for an individual in-text citation without requiring document to be reformatted.

More particularly, the invention provides enhanced "cite while you write" authoring tools functionality. For instance, the system provides for automatic hyper-linking between in-text citation and bibliography. The user will be able to add the ability for in-text citations to be linked to the reference in the bibliography. This gives users the ability to easily navigate between their citations and their bibliographies while writing and editing. Many publishers add links into the documents during the publication markup. Authors lack such tools during the writing and review process. This feature integrates this process and benefits both authors and editors allowing for much easier correspondence between the parts of the document. This feature will also be useful for less formal documents—reports, research notes, etc. This would enable the ability for users to click (ctrl+Click) from an in-text citation directly to the corresponding bibliography entry. In one manner, this feature is applied when a Word document is converted to PDF by using the following: Word 2007's native support for "Save As . . . PDF" and the official Microsoft Plug-in, Adobe Acrobat Pro (version 8, 9, and 10); Macintosh info—Built-in OS PDF save function, Adobe Pro for Mac, Built in "Preview" app for reading.

If there are multiple bibliographies, it is appropriate to have a citation link just to the appearance of the citation in the section being worked on. For instance, if there are multiple bibliographies in the document at the end of each chapter and end of the document, then in-text citations are linked to the reference at the end of the section/chapter. For grouped citations, each author/date or numbered citation should link to each distinct bibliography entry.

Figure 15:
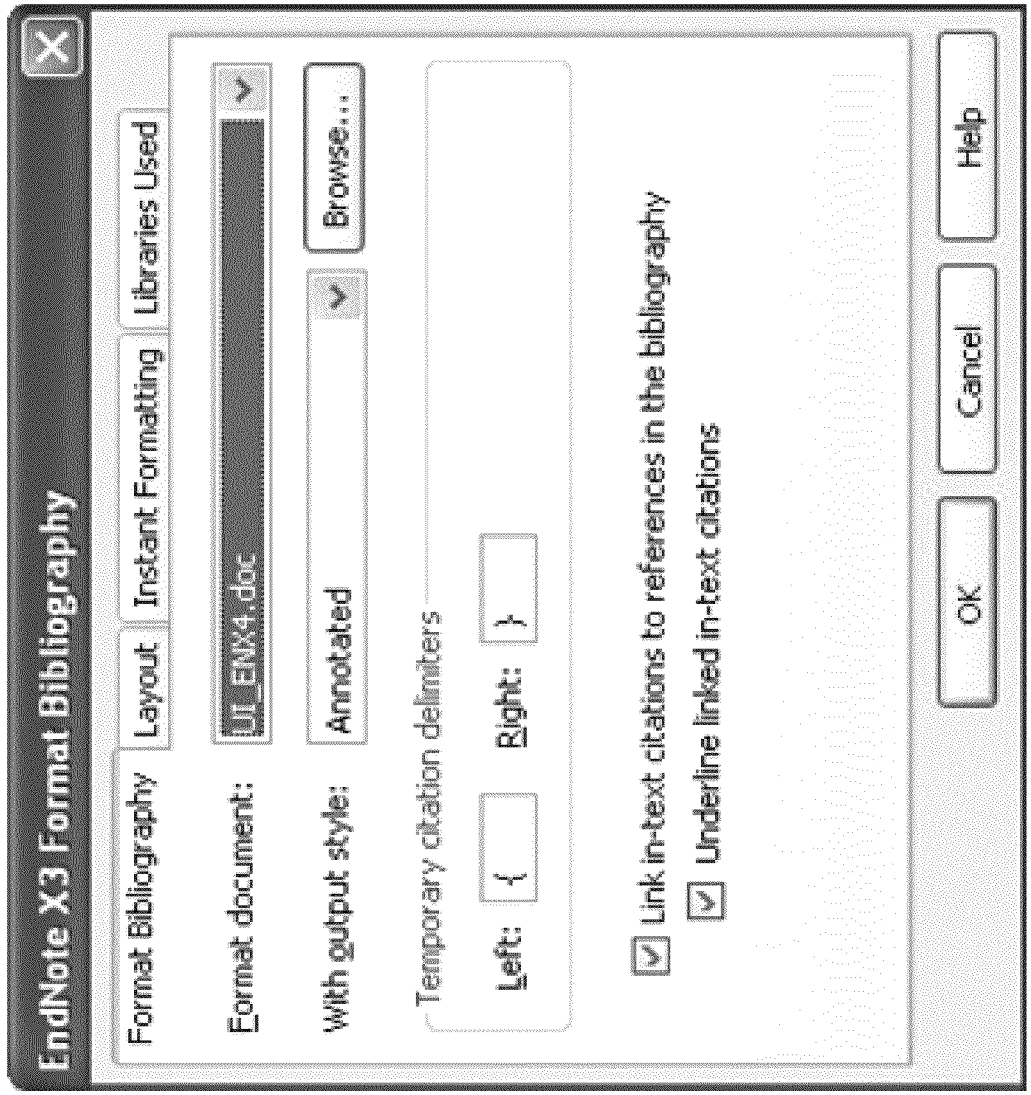
FIG. 15 is a screenshot of a dialog screen serving as a user interface is shown with selected tab "Format Bibliography."
Figure 17:
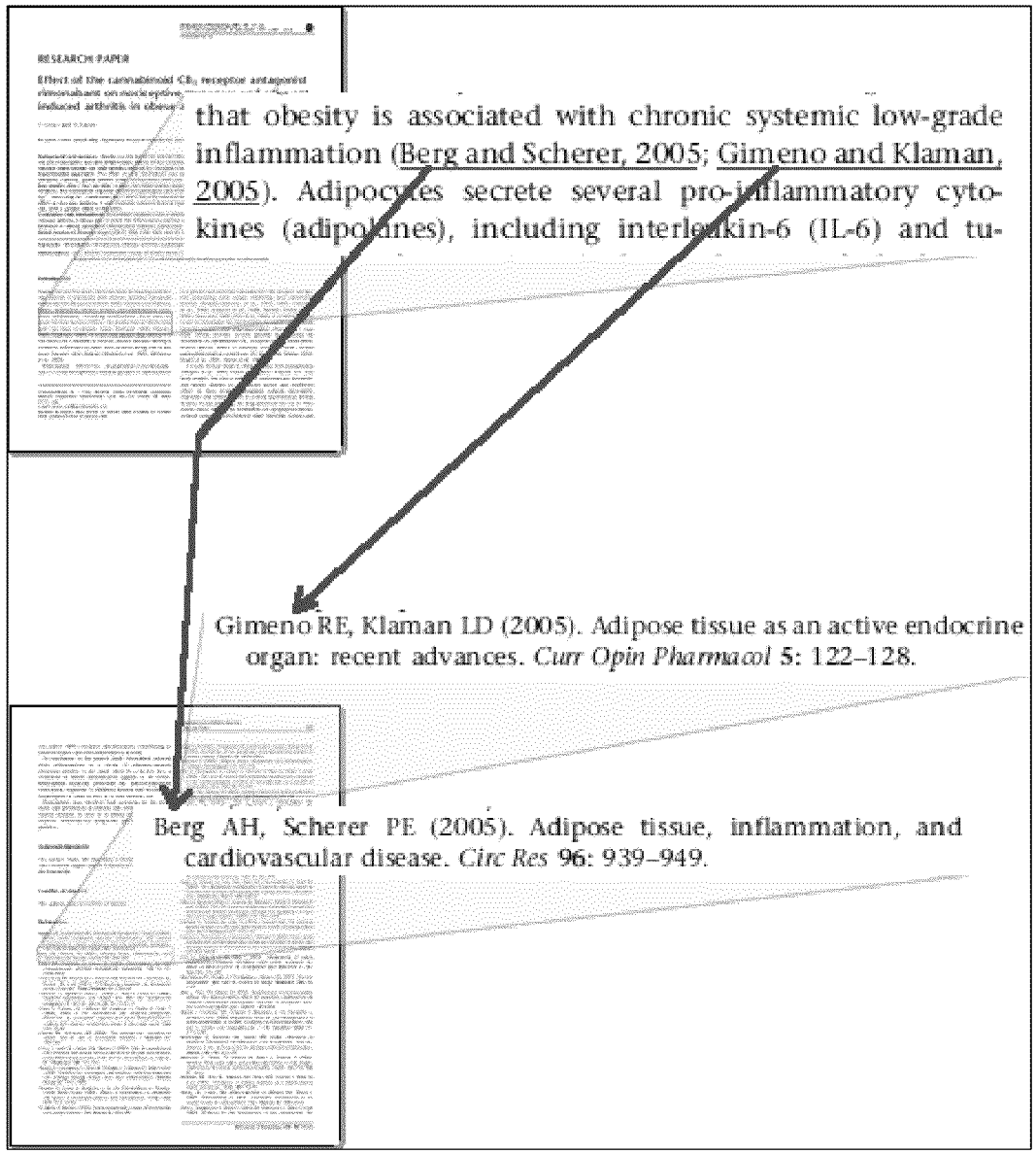
FIG. 17 is an embodiment of a grouped citation in author/date format.

For numbered ranges, the link is to the first one in the range. For grouped citations, each author, date or numbered citation should link to each distinct bibliography entry. For composites, the link is to the main number. With reference to FIG. 15, a dialog screen serving as a user interface is shown with selected tab "Format Bibliography." For this dialog a user can select, in this example, the format document and the desired output style, e.g., Annotated, Chicago, etc. The user can select or "turn on" the hyper-linking in the Format Bibliography dialog. Additional options are for the in-text citations to be underlined and hover text to display the full citation as it appears in the bibliography. By default, the link in-text citations feature is on and with underline turned on. If linking in-text citations is not selected then the options to underline is not available. Citation delimiters may be selected and the formatting of the hyperlink may be in a preference setting, where the user can, for example, determine whether hyper-linked text should be colored or underlined. The setting may be on a per document basis or may be by groupings. An exemplary set of preferences is displayed in the Format Bibliography dialog of FIG. 15. FIG. 17 shows an example of a grouped citation in author/date format.

With reference to FIG. 16, for numbered citations, the number (e.g., highlighted #14) links to the citation (Argus, 1991) in the bibliography. For numbered ranges, link the first one in the range. So if the range is "x-y", x-y is linked and the link will go to reference x. For example, for the following in-text citation, " . . . as shown by the Berkeley studies conducted in 1987[3-6] and 1989[1,7]", the 1987[3-6] in-text citation will link to the 3rd reference in the bibliography. Note for 1989[1,7], the "1" links to the 1st reference and the "7" links to the 7th reference in the bibliography. For composite references, the link goes to the main number. For example, (1a, 1b) links to the composite citation referenced by "1" in the bibliography. Furthermore, (3a, 3b, 7c-e) has two links, the first to the composite citation referenced by "3" in the bibliography and the second to the composite citation referenced by "7" in the bibliography.

An additional function may be included to assist users in manipulating references used or included in documents, e.g., MS Word document, this embodiment provides users a "snapshot" of the references that they're currently using. This allows them to verify which references they are using against other references in the user's library and/or the user's traveling library. An additional function may be added, e.g., in EndNote authoring tool, to create an easily readable report of the citations (and the count for number of times they are used) from a given document.

An additional function may be included to provide users an easily readable, live report or list of references included in a document. For instance, a UI may be included, e.g., in OpenOffice, to enhance the user experience. The document is formatted and should be updated on reformatting. The function preferably shows which library the references come from and preferably includes the ability to link directly to the source reference in the authoring application, e.g., EndNote, and the ability to link to the first appearance of a reference in the word processor. The report may include the number of times a reference is used in a document. A similar function may be provided, e.g., "go to endnote" button, to allow a user to go directly to the report. The list view preferably includes all references in the document, and a "smart group" may be provided to show only those references found in the open library. The auto-group is preferably removed when closing the associated Word document. Multiple auto groups associated with multiple Word documents are supported up to, for example, a group limit (e.g., 500).

An additional function may be included to add "Document Title: "DocumentTitle.doc"—including file extension Reference Report. This function provides users a clear and simple list of references used in a given Word document. For example, in EndNote, a user may create an auto-group of "References used in Word Document." The document autogroup may be session-based depending on the authoring tool application, e.g., EndNote.

One exemplary workflow is as follows. A single user, writing a paper using Word and EndNote, navigating back and forth between the two applications has the need to see a quick and simple list of references inserted into the current paper only. This user also has the need to know more detailed information in a list display—e.g., the number of times a reference was used. The user will likely also have further need to edit/modify these references and it would be convenient for them to access these editing features easily from the basic list display. Much of this editing will be done in Word but the user will likely need to edit some items in EndNote too.

Another exemplary workflow is as follows. A user is collaborating with another author (co-author) on a common document using Word and EndNote. The authors transfer the common document back and forth, both inserting references from EndNote from each author's respective libraries. This may be so even though they have most of their references in common. In several places in the common document they have both added the same reference from their respective libraries. For final editing, the user may double check all of the references that he and the co-author have inserted and make sure that they match the ones that are in the user's "master" library. Much of the final editing may be done in Word but the user will likely need to edit some items in the authoring application, e.g., EndNote, too. Because the authors have processed many edits, the user will likely need to make sure that all the references the authors originally wanted to use are in the final paper. The Traveling Library function used in the workflow may include a record number of references that is different than an otherwise identical reference in each author's respective library. The function allows users the ability to know the source of the references (a specific library name or the Traveling Library) and to easily substitute the record from the author library without having to search through the whole document to do this.

Figure 18:
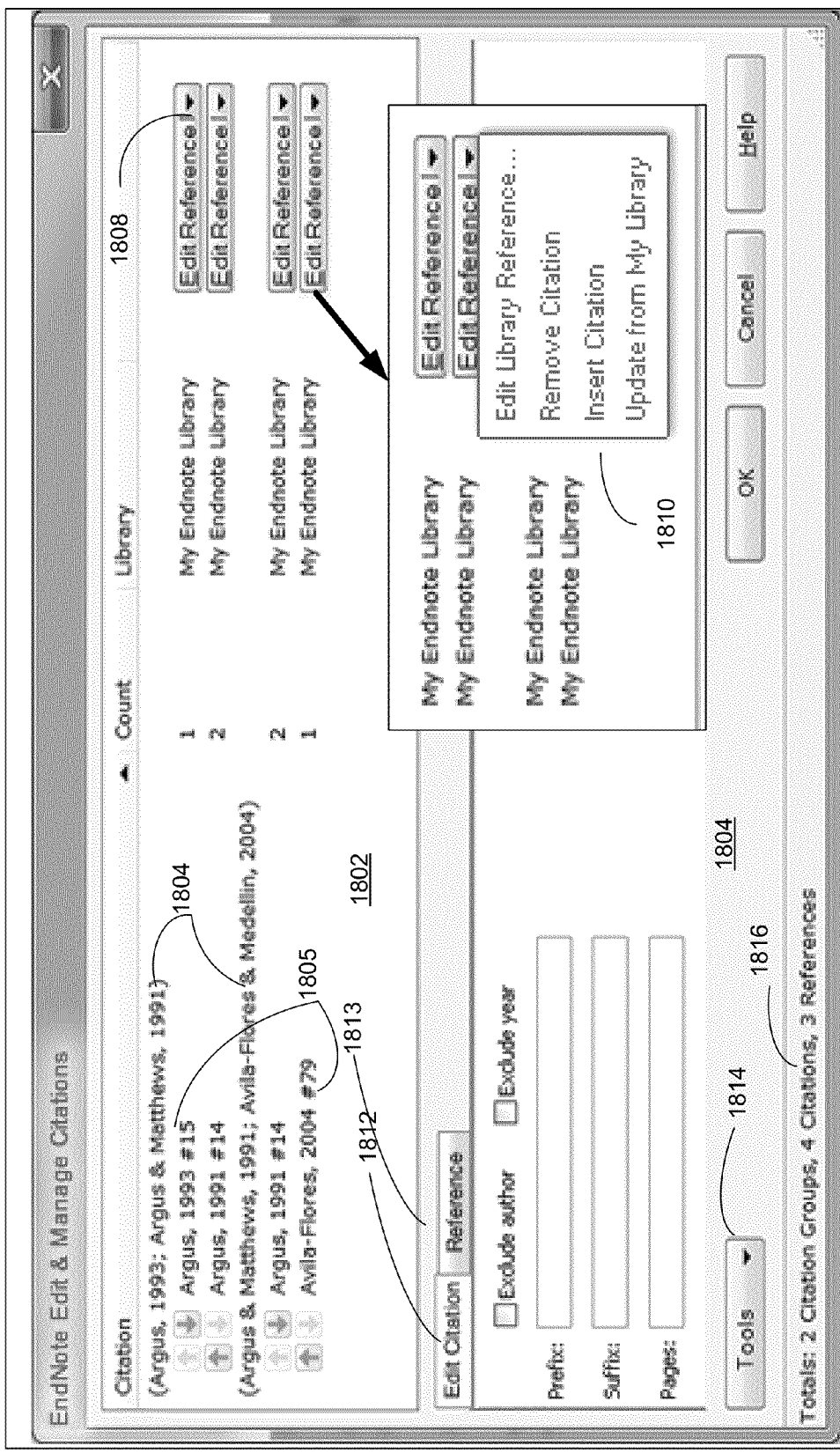
FIG. 18 is a screenshot of an "Edit & Manage Citations" dialog/UI screen that integrates the author reference tracking functions.
Figure 19:
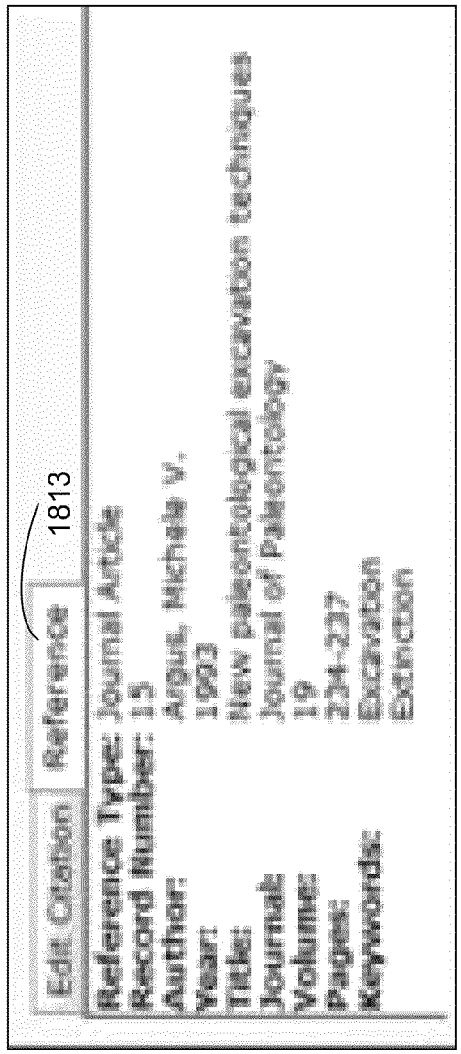
FIG. 19 is screenshot of a section of a UI displaying the reference associated with a citation.
Figure 20:
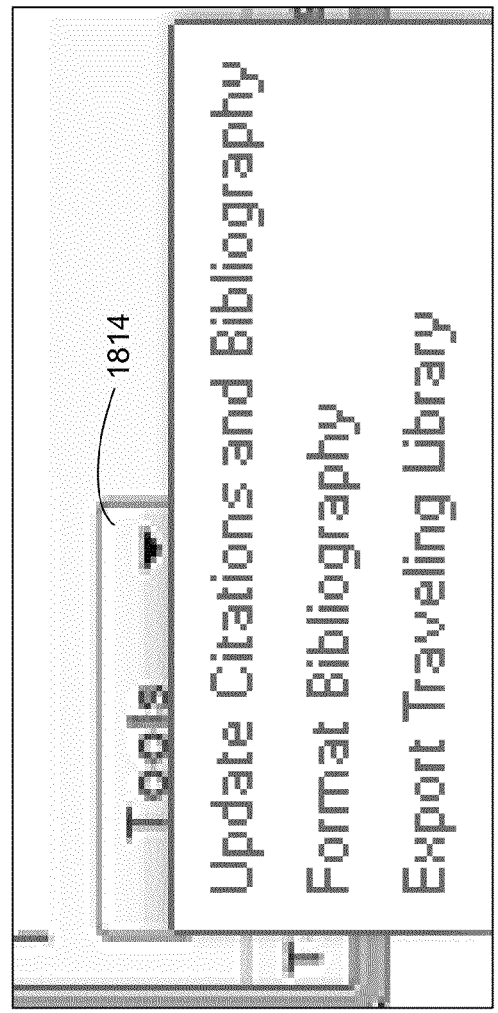
FIG. 20 is a screenshot of a section of a UI displaying a tools dropdown box for updating citations and bibliographies.

With reference to FIG. 18, the "Cite While You Write" application provides an "Edit & Manage Citations" dialog/UI screen 1800 that integrates the author reference tracking functions described herein. The "Edit & Manage Citations" function is deployed with a main table with reference information region 1802 including citation groups 1804, comprising citations 1805, and Edit Reference buttons 1808 and resulting pull-down listing 1810. When a user clicks on a reference 1805, the background document will go to that reference. This provides the in-text context. If there are many references, the panel will have a scrollbar. The table 1802 has four columns as described below. "Citation" displays a representation of the citation/reference 1805 in the form: <first author's last name>, <year>, <record number>. References 1805 are in alphabetical order by default with Group citations 1804 sorted by the first author of the first citation 1805. All references 1805 in the group citation 1804 are listed under the group citation. Each citation under the group citation may be preceded by up and down arrow buttons. The first citation listed will have an inactive version of the up arrow button. The last list citation will have an inactive version of the down arrow button. The up and down arrow buttons change the order of the citation among the citations of the group citation. Alternatively, the table 1802 may sort citations by count and the grouped citations not displayed. "Count" represents the number of times each reference 1805 is cited in the document. "Library" is the name of the library used for last formatting of the reference 1805. Selecting the main body part of the "Edit Reference" button 1808 links to the underlying authoring application (e.g., EndNote) to the record in a Reference Window. Selecting or clicking on the down arrow part of the Edit Reference button 1808 offers a list of options including: Edit Library Reference; Remove Citation; Insert Citation; and Update from My Library.

The "Edit Library Reference" option functions similarly to the main part of the button 1808. Edit Library Reference may be made available only for citations for which the library is not Traveling Library. The "Remove Citation" option removes the highlighted citation from the list of citations. The "Insert Citation" option displays the "Find Citations" dialog and adds a citation within the same set of delimiters. The Edit & Manage Citations dialog and the Word document are updated with the new citation. The "Update from My Library" option serves to update the user's library of references.

Edit & Manage Citations dialog/UI screen 1800 includes Bottom panel 1804. The "Edit Citation" tab 1812 contains similar formatting features included in the Edit Citation dialog discussed above. The "Exclude Author" box may be selected to omit the author name from the highlighted citation. The "Exclude Year" box may be selected to omit the year from the highlighted citation. The "Prefix" field allows entry of text to be printed immediately before the citation text (spaces are significant). The "Suffix" field allows entry of text to be printed immediately after the citation text (spaces are significant).

A user may enter page numbers in the field if desired to always print page numbers after the citation, and always with the same punctuation. Otherwise, the "Pages" field is used to enter page numbers to be printed as part of the citation. To display and print, the Cited Pages field must be listed in the Citations Template or Footnotes Template of your Output Style. Putting page numbers here allows you to change, for each Output Style, both the placement of page numbers and their surrounding punctuation in the citation. The "Reference" tab displays the data for the selected reference in the upper panel in tagged format. The "Tools" Button 1814 offers three functions: Export Traveling Library; Update Citations and Bibliography; and Format Bibliography. The "Update Citations and Bibliography" option either formats the bibliography for the first time or reformats the bibliography. The "Format Bibliography" option brings up the Format Bibliography dialog, e.g., FIG. 15.

Figure 21:
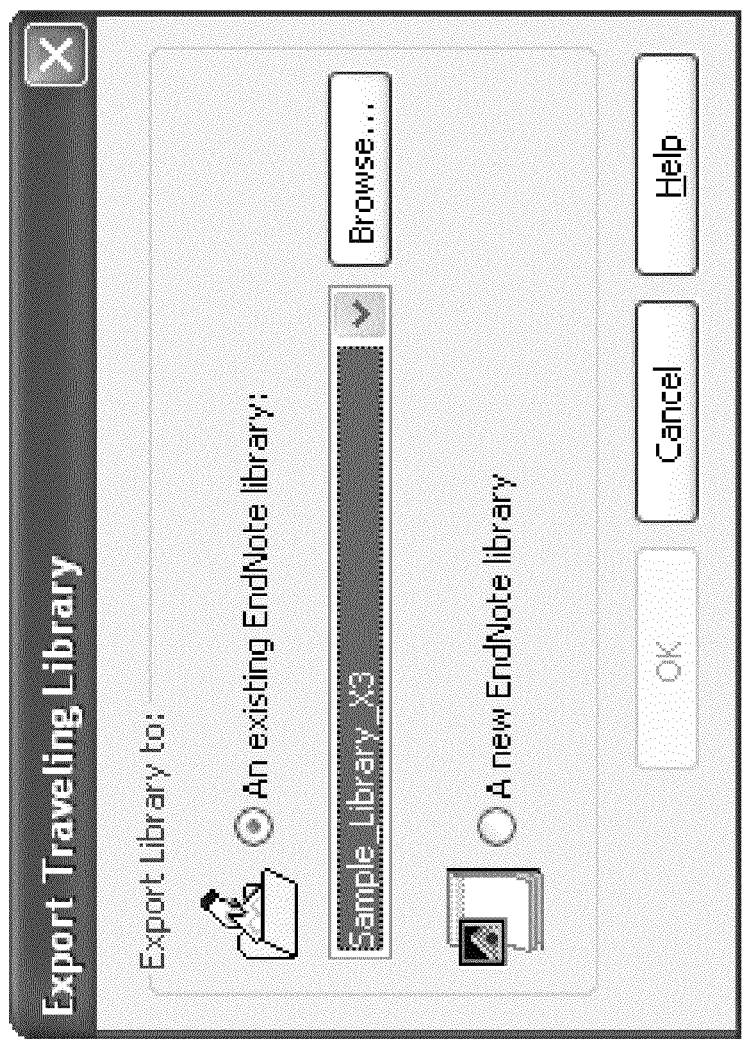
FIG. 21 is a screenshot of a section of a UI displaying the "Export Traveling Library" option for the Export Traveling Library dialog where the user selects the destination library.

With reference to FIG. 21, the "Export Traveling Library" option opens the Export Traveling Library dialog where the user selects the destination library, e.g., "Sample_Library_X3." The references can be imported into an existing open library (as shown) or a new library. If the user selects an existing library, duplicate references will be discarded based on the duplication preferences. Bottom panel 1804 also includes a "Totals" region which represents and displays the number of Citation Groups, in-text citations, and references in the bibliography.

Figure 22:
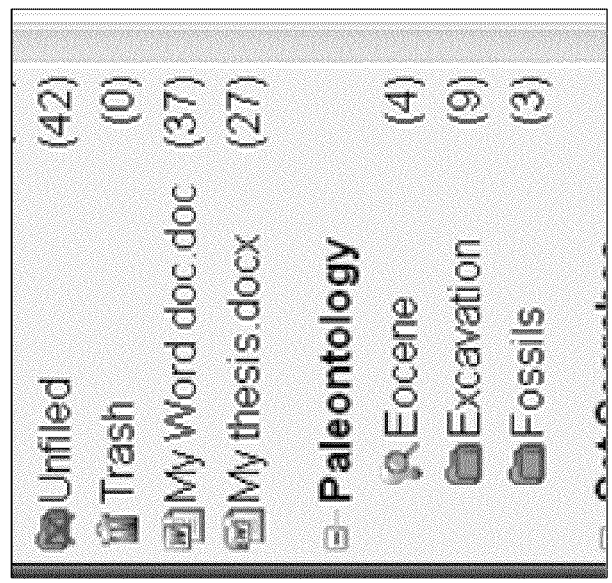
FIG. 22 is an auto-group that is created when the Word document is created.

With reference to FIG. 22, an auto-group is created when the Word document is created. The document name will be used as the name of the auto-group. Upon closing the document, the auto-group is removed. Upon reformatting the document, the auto-group is updated. Auto-groups may be session based. Upon closing the authoring application, e.g., EndNote, the auto-group is not displayed unless the document is also open.

Figure 23:
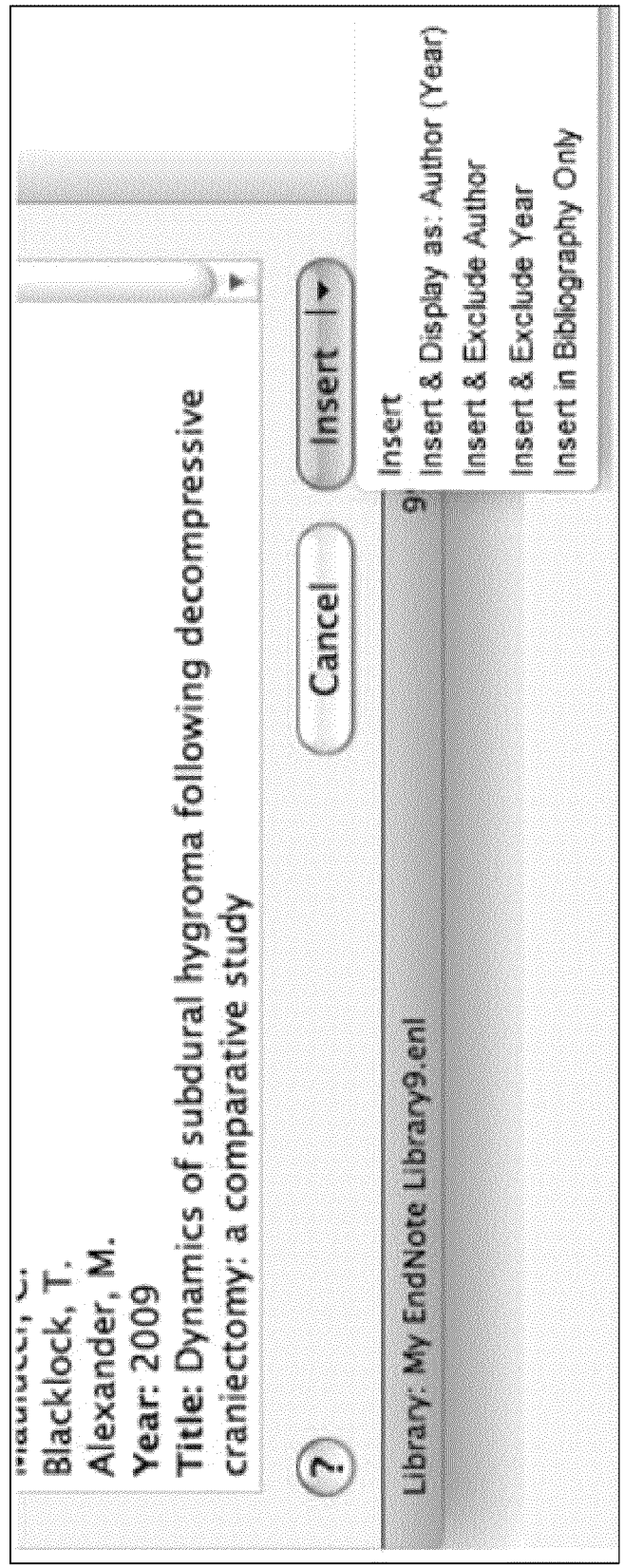
FIG. 23 is a screenshot of a section of a UI displaying an enhanced feature which provides users with the ability to rapidly switch between in-text citation formats.

With reference to FIG. 23, an enhanced feature provides users with the ability to rapidly switch between in-text citation formats. The "Insert" menu options includes a number of options directed to allow users to select a preferred manner of inserting citations. The options are shown in the Insert pull-down menu but may also be included in the find and insert option, in the edit and manage citations option and as an option available when right clicking on a citation and selecting the edit citation option. The "Insert" option enables a user to insert a citation. Upon selecting the "Insert and Display as Author (Year)" option, the citation will display, when formatted, as Author (Year) unless a style is selected and the format does not conform to stylistic rules. For instance, if a citation is inserted in APA with "insert and exclude author(year)", then nothing is shown. When a selected format does not comply with the formatting rules for a style the citation may not appear. If the style is changed to a style that does comply with the rules of the style, then the citation will appear. For example, a citation inserted with the option "insert and exclude author & year" will appear in numbered format, but will not appear in APA 6th (sections). When authoring a document, a user inserts a citation using the standard in-text citation format, e.g., "The results show that the sun is very hot (Smith, 2010)." The user then wants to insert another citation, e.g., "According to Jones (2010), the sun is very bright." This feature allows this insert treatment for any author date style, similar to use for the existing Insert options to omit author/date information.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer based method for identifying, processing, and managing a set of citations in an electronic document, the method comprising:
 a. identifying, using an identifying module to process the electronic document, a first citation;
 b. determining, using a reference management module, the first citation is an unformatted citation;
 c. querying, using a query module, a first citation library stored in a first location, the first citation library comprising a first set of citation data;
 d. comparing, using a comparing module, the first citation to the first set of citation data;
 e. determining, using a citation matching module, a first set of possible matching citations from the first set of citation data;
 f. based on detecting a predetermined event, querying, using the query module, a second citation library stored in a second location, the second citation library comprising a second set of citation data, wherein the first and second sets of citation data respectively comprise overlapping citation data and citation format data;
 g. comparing, using the comparing module, the first citation to the second set of citation data;
 h. determining, using the citation matching module, a second set of possible matching citations from the second set of citation data; and
 i. formatting, using the reference management module, the first citation based on a selected citation from either the first or second set of possible matching citations.

2. The method of claim 1 further comprising adding an entry in a bibliography based on the first citation.

3. The method of claim 1 further comprising:
 a. processing a set of metadata or tags associated with the first citation to determine whether the citation is in a compatible citation mark-up format; and
 b. upon determining the first citation is not in a compatible citation mark-up format, transforming the first citation and the metadata or tags associated with the first citation into a compatible citation mark-up format.

4. The method of claim 3 wherein the transforming the first citation further comprises transforming the first citation and a set of data associated with the first citation into a proprietary citation data format.

5. The method of claim 4 wherein the set of data associated with the first citation comprises one of footnotes, end-notes, a bibliography, and a table of citations.

6. The method of claim 1 further comprising:
   a. processing the electronic document to identify a second citation;
   b. generating a citation group comprising the first and second citations and a set of citation association data;
   c. adding an entry in a bibliography based on the citation group and the citation association data.

7. The method of claim 6 further comprising:
   a. processing the electronic document to identify a third citation;
   b. adding the third citation to the citation group;
   c. updating the citation group and the citation association data based on the third citation;
   d. updating the bibliography based on the updated citation group and the updated citation association data.

8. The method of claim 6 wherein the set of citation association data comprises a set of alphanumeric labels, the alphanumeric labels conforming to a set of bibliographic formatting rules.

9. The method of claim 1 further comprising presenting for selecting a citation from one or both of the first and second possible matching citations.

10. The method of claim 1 further comprising automatically selecting a citation from one or both of the first and second possible matching citations.

11. A system for identifying, processing, and managing a set of citations in an electronic document, the system comprising a computer having a processor and a memory, the memory comprising code executed by the processor, the system comprising:
   a. an identifying module comprising code when executed by the processor to process the electronic document and identify a first citation;
   b. a reference management module comprising code when executed by the processor to determine whether the first citation is in an unformatted citation;
   c. a query module comprising code when executed by the processor to query a first citation library stored in a first location, the first citation library comprising a first set of citation data;
   d. a comparing module comprising code when executed by the processor to compare the first citation to the first set of citation data;
   e. a citation matching module comprising code when executed by the processor to determine a first set of possible matching citations from the first set of citation data;
   f. wherein the query module further comprises code when executed by the processor to, based on detecting a predetermined event, query a second citation library stored in a second location, the second citation library comprising a second set of citation data, wherein the first and second sets of citation data respectively comprise overlapping citation data and citation format data;
   g. wherein the comparing module further comprises code when executed by the processor to compare the first citation to the second set of citation data;
   h. wherein the citation matching module further comprises code when executed by the processor to determine a second set of possible matching citations from the second set of citation data; and
   i. wherein the reference management module further comprises code when executed by the processor to format the first citation based on a selected citation from either the first or second set of possible matching citations.

12. The system of claim 11 wherein the code stored in the memory and when executed by the processor is further adapted to add an entry in a bibliography based on the first citation.

13. The system of claim 11 wherein the code stored in the memory and when executed by the processor is further adapted to:
   a. process a set of metadata or tags associated with the first citation to determine whether the citation is in a compatible citation mark-up format; and
   b. upon determining the first citation is not in a compatible citation mark-up format, transform the first citation and the metadata or tags associated with the first citation into a compatible citation mark-up format.

14. The system of claim 13 wherein the transforming the first citation further comprises transforming the first citation and a set of data associated with the first citation into a proprietary citation data format.

15. The system of claim 14 wherein the set of data associated with the first citation comprises one of footnotes, endnotes, a bibliography, and a table of citations.

16. The system of claim 11 wherein the code stored in the memory and when executed by the processor is further adapted to:
   a. process the electronic document to identify a second citation;
   b. generate a citation group comprising the first and second citations and a set of citation association data;
   c. add an entry in a bibliography based on the citation group and the citation association data.

17. The system of claim 16 wherein the code stored in the memory and when executed by the processor is further adapted to:
   a. process the electronic document to identify a third citation;
   b. add the third citation to the citation group;
   c. update the citation group and the citation association data based on the third citation;
   d. update the bibliography based on the updated citation group and the updated citation association data.

18. The system of claim 16 wherein the set of citation association data comprises a set of alphanumeric labels, the alphanumeric labels conforming to a set of bibliographic formatting rules.

19. The system of claim 11 wherein the code stored in the memory and when executed by the processor is further adapted to present for selecting a citation from one or both of the first and second possible matching citations.

20. The system of claim 11 wherein the code stored in the memory and when executed by the processor is further adapted to automatically selecting a citation from one or both of the first and second possible matching citations.

* * * * *